United States Patent
Nama et al.

(10) Patent No.: US 11,093,715 B2
(45) Date of Patent: Aug. 17, 2021

(54) METHOD AND SYSTEM FOR LEARNING AND ENABLING COMMANDS VIA USER DEMONSTRATION

(71) Applicant: Samsung Electronics Co., Ltd., Suwon-si (KR)

(72) Inventors: Sandeep Nama, Santa Clara, CA (US); Hongxia Jin, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/370,411

(22) Filed: Mar. 29, 2019

(65) Prior Publication Data
US 2020/0311210 A1   Oct. 1, 2020

(51) Int. Cl.
| | |
|---|---|
| *G06F 40/30* | (2020.01) |
| *G10L 15/18* | (2013.01) |
| *G06F 3/16* | (2006.01) |
| *G06F 40/205* | (2020.01) |
| *G06F 40/289* | (2020.01) |
| *G10L 15/08* | (2006.01) |

(52) U.S. Cl.
CPC .............. *G06F 40/30* (2020.01); *G06F 3/167* (2013.01); *G06F 40/205* (2020.01); *G06F 40/289* (2020.01); *G10L 15/1815* (2013.01); *G10L 2015/088* (2013.01)

(58) Field of Classification Search
CPC ................................. G10L 15/22; G06F 40/30
See application file for complete search history.

(56) References Cited

U.S. PATENT DOCUMENTS

| | | | |
|---|---|---|---|
| 7,546,576 B2 * | 6/2009 | Egli | ........................ H04L 29/06 |
| | | | 715/239 |
| 7,933,766 B2 | 4/2011 | Gupta et al. | |

(Continued)

FOREIGN PATENT DOCUMENTS

| | | |
|---|---|---|
| EP | 3347812 A1 | 9/2016 |
| JP | 2002-259113 A | 9/2002 |

(Continued)

OTHER PUBLICATIONS

Shi, T. et al., "World of Bits: An Open-Domain Platform for Web-Based Agents", Proceedings of the 34th International Conference on Machine Learning, Aug. 2017, pp. 3135-3144, PMLR 70, United States.

(Continued)

*Primary Examiner* — Anne L Thomas-Homescu
(74) *Attorney, Agent, or Firm* — Sherman IP LLP; Kenneth L. Sherman; Steven Laut

(57) ABSTRACT

A method for learning a task includes capturing first information associated with at least one application executed by an electronic device. A sequence of user interface interactions for the at least one application is recorded. Second information are extracted from the sequence of user interface interactions. Events, action or a combination thereof are filtered from the second information using the first information. Recognition is performed on each element from the first information to generate a semantic ontology. An executable sequential event task bytecode is generated from each element of the semantic ontology and the filtered second information.

17 Claims, 14 Drawing Sheets

(56) References Cited

U.S. PATENT DOCUMENTS

| | | | |
|---|---|---|---|
| 7,958,499 B2* | 6/2011 | Doi | G06F 9/45504 |
| | | | 717/148 |
| 7,983,997 B2 | 7/2011 | Allen et al. | |
| 8,407,057 B2 | 3/2013 | Comerford et al. | |
| 8,670,972 B1* | 3/2014 | Varman | H04M 3/4936 |
| | | | 703/24 |
| 9,064,222 B2 | 6/2015 | Saad et al. | |
| 9,454,732 B1 | 9/2016 | Garton et al. | |
| 10,082,954 B2 | 9/2018 | Jarrous et al. | |
| 10,229,680 B1* | 3/2019 | Gillespie | G06F 40/295 |
| 2006/0230319 A1 | 10/2006 | Ryali et al. | |
| 2009/0119587 A1 | 5/2009 | Allen et al. | |
| 2011/0038512 A1* | 2/2011 | Petrou | G06F 16/532 |
| | | | 382/118 |
| 2011/0060709 A1 | 3/2011 | Ide et al. | |
| 2013/0067497 A1 | 3/2013 | Seo et al. | |
| 2013/0275164 A1 | 10/2013 | Gruber et al. | |
| 2014/0036023 A1* | 2/2014 | Croen | H04N 7/147 |
| | | | 348/14.01 |
| 2014/0067392 A1* | 3/2014 | Burke | G10L 15/30 |
| | | | 704/236 |
| 2015/0074653 A1* | 3/2015 | Eracar | G01R 31/31908 |
| | | | 717/129 |
| 2016/0210445 A1* | 7/2016 | Deaver | G06F 21/12 |
| 2016/0335316 A1 | 11/2016 | Riva et al. | |
| 2016/0350673 A1 | 12/2016 | Kumar et al. | |
| 2017/0024561 A1* | 1/2017 | Hajmasan | G06F 21/55 |
| 2017/0337211 A1* | 11/2017 | Netsch | G06F 16/34 |
| 2018/0173403 A1 | 6/2018 | Carbune et al. | |
| 2018/0188934 A1 | 7/2018 | Andrizzi et al. | |
| 2018/0189615 A1* | 7/2018 | Kang | G06K 9/00684 |
| 2018/0349450 A1* | 12/2018 | Smyth | G06F 3/0485 |
| 2019/0080698 A1 | 3/2019 | Miller et al. | |
| 2019/0102482 A1 | 4/2019 | Ni et al. | |
| 2019/0222540 A1 | 7/2019 | Relangi et al. | |
| 2019/0341039 A1 | 11/2019 | Bharadwaj et al. | |
| 2019/0348030 A1 | 11/2019 | Anders et al. | |
| 2020/0026554 A1* | 1/2020 | Kogure | G06F 8/61 |
| 2020/0257996 A1 | 8/2020 | London et al. | |
| 2020/0279556 A1 | 9/2020 | Gruber et al. | |
| 2020/0312299 A1 | 10/2020 | Nama et al. | |

FOREIGN PATENT DOCUMENTS

| | | |
|---|---|---|
| JP | 2014048805 A | 3/2014 |
| KR | 2001-0076775 A | 8/2001 |
| KR | 10-1348645 B1 | 12/2013 |

OTHER PUBLICATIONS

International Search Report and Written Opinion dated Jun. 26, 2020 for International Application PCT/KR2020/003697 from Korean intellectual Property Office, pp. 1-8, Republic of Korea.

International Search Report and Written Opinion dated Aug. 11, 2020 for International Application PCT/US2020/30891 from U.S. Receiving Office, pp. 1-15, United States.

U.S. Non-Final Office Action for Application U.S. Appl. No. 16/370,497 dated Sep. 11, 2020.

U.S. Final Office Action for U.S. Appl. No. 16/370,497 dated Mar. 19, 2021.

U.S. Advisory Action for U.S. Appl. No. 16/370,497 dated Jun. 1, 2021.

* cited by examiner

METHOD AND SYSTEM FOR LEARNING AND ENABLING COMMANDS VIA USER DEMONSTRATION

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments generally relate to task learning for electronic devices, in particular, to task learning for virtual assistants or voice assistants using user demonstration for generation of a task bytecode for at least one application.

BACKGROUND

Personal Assistants (PAs) and smart agents are present across mobile devices, television devices, home speakers, consumer electronics, etc. to carry out user tasks as skills on multi-modal devices. In mobile devices the PAs and smart agents mostly work with applications to perform specific tasks, in response to user requests with voice commands, textual inputs, shortcut buttons and/or gestures. To perform these tasks, the PA or smart agent's platform developers or application developers need to implement 'Task Execution' by calling an application programming interfaces (APIs) provided by app developers. For example, if there is no API or interface of specific application to implement the actions for fulfillment of the task, the user request may not be performed.

In one popular mobile applications platform "ANDROID®," there has approximately 3.8 million apps in an app store as of Q1 2018. In this app store, there are less than 0.5% apps that have an API provided to developers to fulfill the tasks when used in a PA and smart agents.

SUMMARY

One or more embodiments generally relate to task learning for virtual assistant using user demonstration for generation of a task bytecode for at least one application. In one embodiment, a method for learning a task includes capturing first information associated with at least one application executed by an electronic device. A sequence of user interface interactions for the at least one application is recorded. Second information are extracted from the sequence of user interface interactions. Event, action or a combination thereof are filtered from the second information using the first information. Recognition is performed on each element from the first information to generate a semantic ontology. An executable sequential event task bytecode is generated from each element of the semantic ontology and the filtered second information.

In some embodiments, an electronic device includes a memory storing instructions. At least one processor executes the instructions including a process configured to: capture first information associated with at least one application executed by an electronic device; record a sequence of user interface interactions for the at least one application; extract second information from the sequence of user interface interactions; filter event, action or a combination thereof from the second information using the first information; perform recognition on each element from the first information to generate a semantic ontology; and generate an executable sequential event task bytecode from each element of the semantic ontology and the filtered second information.

In one or more embodiments, a non-transitory processor-readable medium that includes a program that when executed by a processor performing a method that includes capturing first information associated with at least one application executed by an electronic device. A sequence of user interface interactions for the at least one application is recorded. Second information are extracted from the sequence of user interface interactions. Event, action or a combination thereof are filtered from the second information using the first information. Recognition is performed on each element from the first information to generate a semantic ontology. An executable sequential event task bytecode is generated from each element of the semantic ontology and the filtered second information.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

It should be noted that the terms "at least one of" refers to one or more than one of the elements that follow. For example, "at least one of a, b, c, or a combination thereof" may be interpreted as "a," "b," or "c" individually; or as "a" and "b" together in combination, as "b" and "c" together in combination; as "a" and "c" together in combination; or as "a," "b" and "c" together in combination.

In one or more embodiments, "task" may refer to a user task including one or more steps to complete a goal. Some tasks may be achieved via interactions with one or more apps, such as adding a calendar event, sending a message, booking flight, booking a ride, etc. Some tasks may involve one or more devices or equipment and one or more actions controlling the one or more devices or equipment, such as setting up an entertainment environment for the evening, scheduling a morning routine. etc.

One or more embodiments provide for task learning for virtual assistant using user demonstration for generation of a task bytecode for at least one application. In some embodiments, a method for learning a task includes capturing first information associated with at least one application executed by an electronic device. A sequence of user interface interactions for the at least one application is recorded. Second information are extracted from the sequence of user interface interactions. Event, action or a combination thereof are filtered from the second information using the first information. Recognition is performed on each element from the first information to generate a semantic ontology. An executable sequential event task bytecode is generated from each element of the semantic ontology and the filtered second information.

Figure 1:
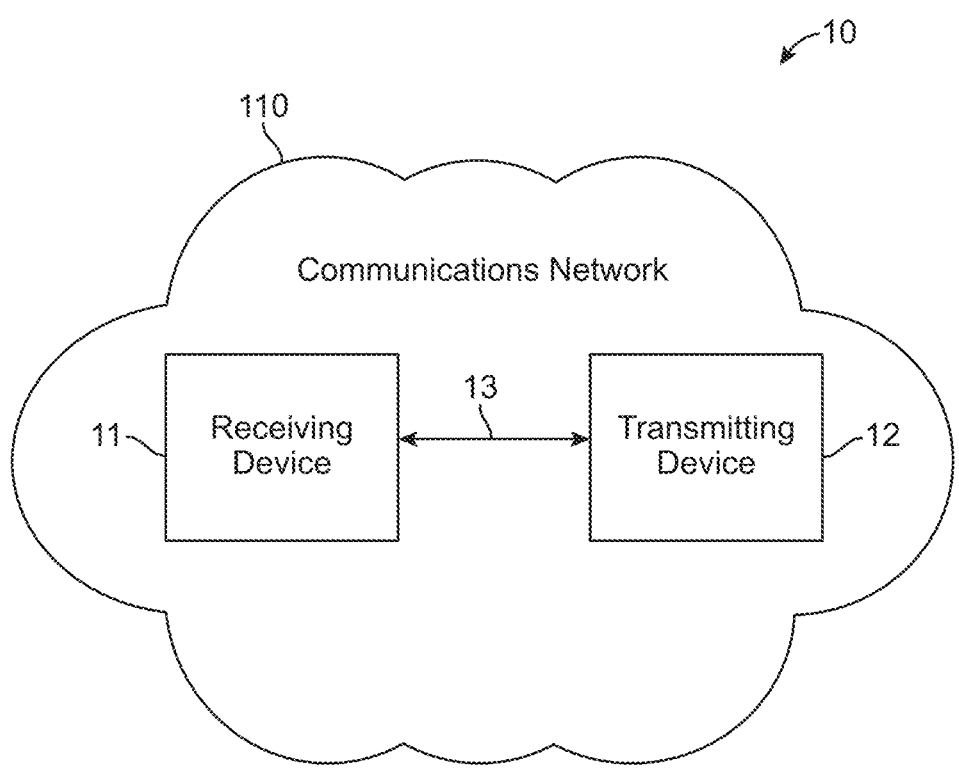
FIG. 1 shows a schematic view of a communications system, according to some embodiments.

FIG. 1 is a schematic view of a communications system 10, in accordance with one or more embodiments. Communications system 10 may include a communications device that initiates an outgoing communications operation (transmitting device 12) and a communications network 110, which transmitting device 12 may use to initiate and conduct communications operations with other communications devices within communications network 110. For example, communications system 10 may include a communication device that receives the communications operation from the transmitting device 12 (receiving device 11). Although communications system 10 may include multiple transmitting devices 12 and receiving devices 11, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., an IEEE 802.11 protocol), BLUETOOTH®, high frequency systems (e.g., 900 MHz, 2.4 GHz, and 5.6 GHz communication systems), infrared, other relatively localized wireless communication protocol, or any combination thereof. In some embodiments, the communications network 110 may support protocols used by wireless and cellular phones and personal email devices (e.g., a BLACKBERRY®). Such protocols may include, for example, GSM, GSM plus EDGE, CDMA, quadband, and other cellular protocols. In another example, a long-range communications protocol can include Wi-Fi and protocols for placing or receiving calls using VOIP, LAN, WAN, or other TCP-IP based communication protocols. The transmitting device 12 and receiving device 11, when located within communications network 110, may communicate over a bidirectional communication path such as path 13, or over two unidirectional communication paths. Both the transmitting device 12 and receiving device 11 may be capable of initiating a communications operation and receiving an initiated communications operation.

The transmitting device 12 and receiving device 11 may include any suitable device for sending and receiving communications operations. For example, the transmitting device 12 and receiving device 11 may include, but are not limited to devices including a voice assistant (personal assistant, virtual assistant, etc.) such as mobile telephone devices, television (TV) systems, smart TV systems, cameras, camcorders, a device with audio video capabilities, tablets, wearable devices, smart appliances, smart picture frames, and any other device capable of communicating wirelessly (with or without the aid of a wireless-enabling accessory system) or via wired pathways (e.g., using traditional telephone wires). The communications operations may include any suitable form of communications, including for example, voice communications (e.g., telephone calls), data communications (e.g., data and control messaging, e-mails, text messages, media messages), video communication, or combinations of these (e.g., video conferences).

Figure 2:
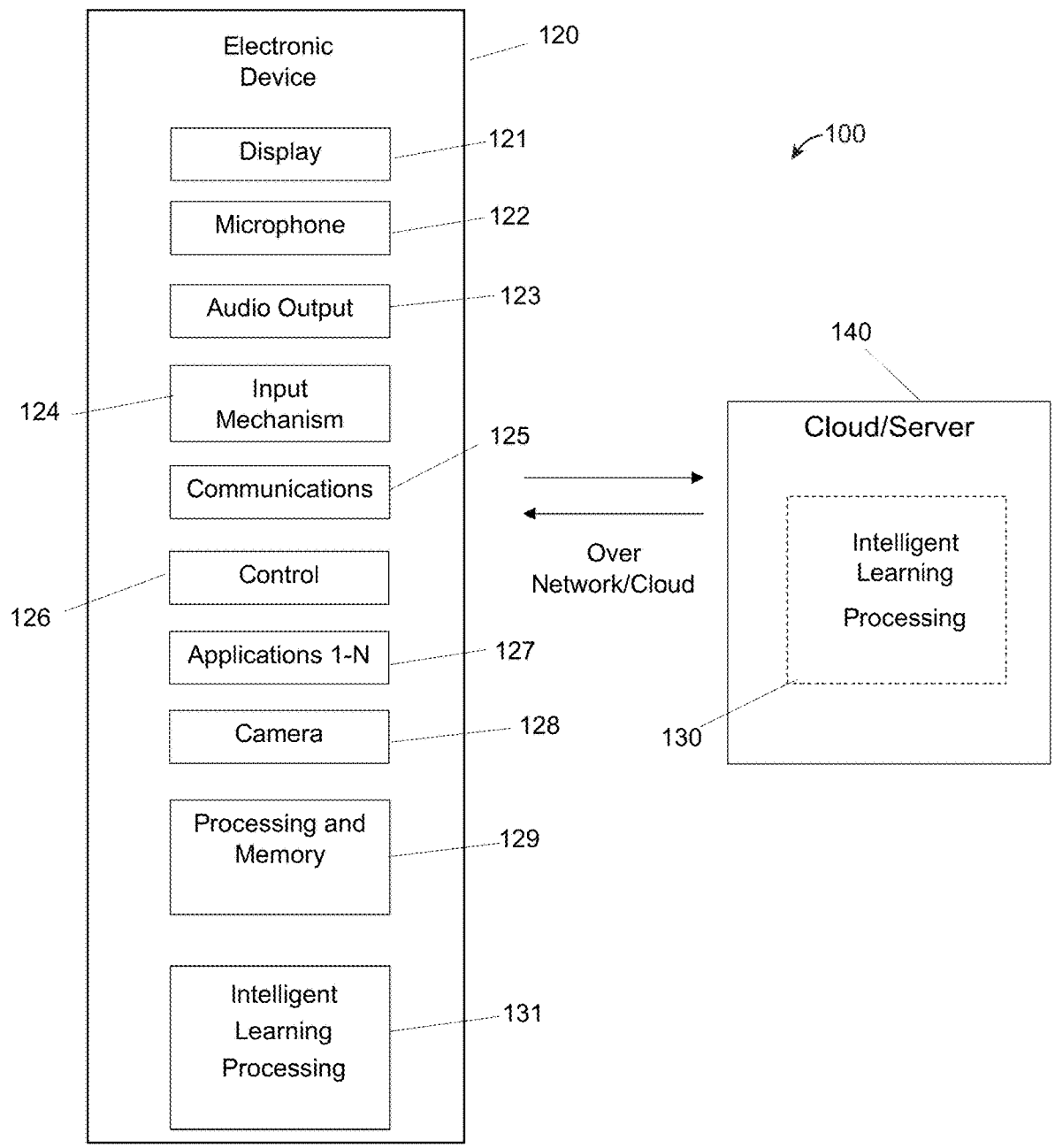
FIG. 2 shows a block diagram of architecture for a system including an electronic device and a cloud or server environment, that is capable of performing individually or in combination, intelligent learning processing, according to some embodiments.

FIG. 2 shows a block diagram of an architecture for a system 100 that is capable of performing task learning for a virtual assistant or smart agent using user demonstration for generation of a task bytecode for at least one application using an electronic device 120 (e.g., mobile telephone devices, TV systems, cameras, camcorders, a device with audio video capabilities, tablets, pad devices, wearable devices, smart appliances, smart picture frames, smart lighting, etc.), a cloud or server 140, or a combination of the electronic device 120 and the cloud computing (e.g., shared pools of configurable computing system resources and higher-level services, etc.) or server (e.g., a computer, device, or program that manages network resources, etc.) 140. Both the transmitting device 12 (FIG. 1) and receiving device 11 may include some or all of the features of the electronics device 120. In some embodiments, the electronic device 120 may comprise a display 121, a microphone 122, an audio output 123, an input mechanism 124, communications circuitry 125, control circuitry 126, a camera 128, processing and memory 129, intelligent learning (e.g., using ILS 300 processing, FIG. 3) processing 130 and/or 131 (for processing on the electronic device 120, on the cloud/server 140, on a combination of the electronic device 120 and the cloud/server 140, communicating with the communications circuitry 125 to obtain/provide information thereof with the cloud or server 140; and may include any of the processing for, but not limited to, the examples as described below), and any other suitable components. Applications 1-N 127 are provided and may be obtained from a cloud or server 140, a communications network 110, (FIG. 1) etc., where N is a positive integer equal to or greater than 1.

In some embodiments, all of the applications employed by the audio output 123, the display 121, input mechanism 124, communications circuitry 125, and the microphone 122 may be interconnected and managed by control circuitry 126. In one example, a handheld music player capable of transmitting music to other tuning devices may be incorporated into the electronics device 120.

In some embodiments, the audio output 123 may include any suitable audio component for providing audio to the user of electronics device 120. For example, audio output 123 may include one or more speakers (e.g., mono or stereo speakers) built into the electronics device 120. In some embodiments, the audio output 123 may include an audio component that is remotely coupled to the electronics device 120. For example, the audio output 123 may include a headset, headphones, or earbuds that may be coupled to communications device with a wire (e.g., coupled to electronics device 120 with a jack) or wirelessly (e.g., BLUETOOTH® headphones or a BLUETOOTH® headset).

In some embodiments, the display 121 may include any suitable screen or projection system for providing a display visible to the user. For example, display 121 may include a screen (e.g., an LCD screen, LED screen, OLED screen, etc.) that is incorporated in the electronics device 120. As another example, display 121 may include a movable display or a projecting system for providing a display of content on a surface remote from electronics device 120 (e.g., a video projector). Display 121 may be operative to display content (e.g., information regarding communications operations or information regarding available media selections) under the direction of control circuitry 126.

In some embodiments, input mechanism 124 may be any suitable mechanism or user interface for providing user inputs or instructions to electronics device 120. Input mechanism 124 may take a variety of forms, such as a button, keypad, dial, a click wheel, mouse, visual pointer, remote control, one or more sensors (e.g., a camera or visual sensor, a light sensor, a proximity sensor, etc., a touch screen, gesture recognition, voice recognition, etc. The input mechanism 124 may include a multi-touch screen.

In some embodiments, communications circuitry 125 may be any suitable communications circuitry operative to connect to a communications network (e.g., communications network 110, FIG. 1) and to transmit communications operations and media from the electronics device 120 to other devices within the communications network. Communications circuitry 125 may be operative to interface with the communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In some embodiments, communications circuitry 125 may be operative to create a communications network using any suitable communications protocol. For example, communications circuitry 125 may create a short-range communications network using a short-range communications protocol to connect to other communications devices. For example, communications circuitry 125 may be operative to create a local communications network using the BLUETOOTH® protocol to couple the electronics device 120 with a BLUETOOTH® headset.

In some embodiments, control circuitry 126 may be operative to control the operations and performance of the electronics device 120. Control circuitry 126 may include, for example, a processor, a bus (e.g., for sending instructions to the other components of the electronics device 120), memory, storage, or any other suitable component for controlling the operations of the electronics device 120. In some embodiments, one or more processors (e.g., in processing and memory 129) may drive the display and process inputs received from the user interface. The memory and storage may include, for example, cache, Flash memory, ROM, and/or RAM/DRAM. In some embodiments, memory may be specifically dedicated to storing firmware (e.g., for device applications such as an operating system, user interface functions, and processor functions). In some embodiments, memory may be operative to store information related to other devices with which the electronics device 120 performs communications operations (e.g., saving contact information related to communications operations or storing information related to different media types and media items selected by the user).

In some embodiments, the control circuitry 126 may be operative to perform the operations of one or more applications implemented on the electronics device 120. Any suitable number or type of applications may be implemented. Although the following discussion will enumerate different applications, it will be understood that some or all of the applications may be combined into one or more applications. For example, the electronics device 120 may include applications 1-N 127 including, but not limited to: an automatic speech recognition (ASR) application, OCR application, a dialog application, PA (or smart agent) app, a map application, a media application (e.g., gallery app, QuickTime, Mobile Music app, or Mobile Video app), social networking applications (e.g., FACEBOOK®, INSTAGRAM®, TWITTER®, etc.), a calendaring application (e.g., a calendar for managing events, appointments, etc.), an Internet browsing application, a recommender application, etc. In some embodiments, the electronics device 120 may include one or multiple applications operative to perform communications operations. For example, the electronics device 120 may include a messaging application, an e-mail application, a voicemail application, an instant messaging application (e.g., for chatting), a videoconferencing application, a fax application, or any other suitable application for performing any suitable communications operation.

In some embodiments, the electronics device 120 may include a microphone 122. For example, electronics device 120 may include microphone 122 to allow the user to transmit audio (e.g., voice audio) for speech control and navigation of applications 1-N 127, during a communications operation or as a means of establishing a communications operation or as an alternative to using a physical user interface. The microphone 122 may be incorporated in the electronics device 120, or may be remotely coupled to the electronics device 120. For example, the microphone 122 may be incorporated in wired headphones, the microphone 122 may be incorporated in a wireless headset, the microphone 122 may be incorporated in a remote control device, etc.

In some embodiments, the camera module 128 comprises one or more camera devices that include functionality for capturing still and video images, editing functionality, communication interoperability for sending, sharing, etc. photos/videos, etc.

In some embodiments, the electronics device 120 may include any other component suitable for performing a communications operation. For example, the electronics device 120 may include a power supply, ports, or interfaces for coupling to a host device, a secondary input mechanism (e.g., an ON/OFF switch), or any other suitable component.

Figure 3:
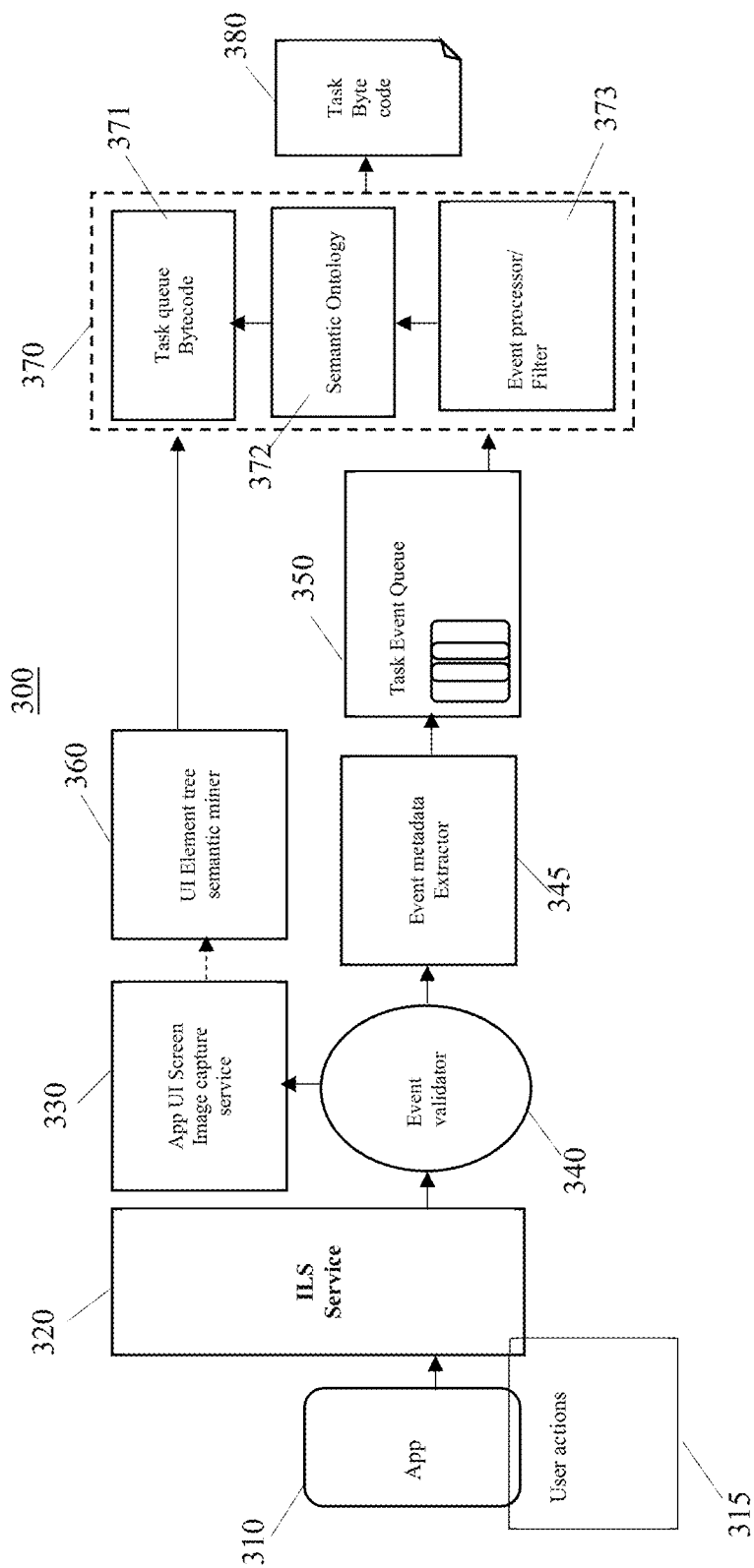
FIG. 3 shows a high-level block diagram for intelligent learning system (ILS) processing, according to some embodiments.

FIG. 3 shows a high-level block diagram for ILS 300 processing, according to some embodiments. In some embodiments, the high-level block diagram for ILS 300 processing includes an app (or application) 310, user actions 315 (e.g., interactions with the app 310), ILS service 320, event validator 340, app UI screen image capture service 330, UI element tree semantic miner 360, event metadata extractor 345, task event queue 350, and bytecode processing 370 that includes task queue bytecode 371 processing, semantic ontology processing 372 and event processor/filter 373. In some embodiments, the result of the ILS 300 processing is the task bytecode 380.

To enable voice commands, gestures, etc. across applications (e.g., applications 1-N 127, FIG. 2, etc.), some embodiments employ ILS 300 processing (task learning system processing). In one or more embodiments, for the ILS 300 processing, a task is demonstrated by the user on an application (e.g., applications 1-N 127, FIG. 2, etc.). ILS 300 processing, from a single shot or one-shot process, performs the task on an application repeatedly with various sets of input values as needed. The input values may come from a user voice command, textual input, gesture, conversation and/or context. In some embodiments, with ILS 300 processing, a voice command can be carried out by an application even though that application does not have voice assistance capability. Learning from demonstration significantly reduces developer effort, time, cost and resources to implement a specific task to support the PA's capability. Any user can generate the task by demonstration, using mobile application as ease as normal without needing a learning curve.

In some embodiments, the ILS 300 processing generates a task bytecode in response to a series of user actions demonstrated by a user on one or more applications to carry out a task. Each user gesture or action generates one or more events that may contain and/or reflect various data, states (e.g., a particular condition at a particular time) and/or context (e.g., time, date, interaction or usage with an electronic device/application, place, calendar event/appointment, activity, etc.) in a task execution sequence. In one or more embodiments, a mobile application (e.g., intelligent learning processing 131, intelligent learning processing 130, or a combination of intelligent learning processing 130 and 131, etc.) for ILS 300 processing is highly dynamic, state represented and context aware. Not only may user action(s) generate the one or more events, a sequence of events may be generated by device, and/or dependable services as well. In some embodiments, a task execution sequence is determined by filtering unwanted events based on semantically understanding of the action(s). The ILS 300 processing is highly context aware for learning the task, where the context helps understand the states and event priorities to generate the task bytecode that can be executed with high accuracy.

In some embodiments, the ILS 300 processing captures the events (e.g., events generated alongside the user actions 315) based on application user interface (UI) interactions (e.g., using app UI screen image capture service 330) where the ILS 300 processing can obtain detailed information of one or more UI elements. In one example, for the ANDROID® system, an app UI screen image capture service 330 is implemented based on the accessibility service, which enables the listeners of UI actions as a background service and configures which user actions can be captured or ignored in response to user interaction with an application. When the user performs a UI action, a callback method is generated to the app UI screen image capture service 330 where information for user actions are captured as an event. The event contains detailed information such as user action type (e.g., click, long click, select, scroll, etc.), UI element, type of the UI element, position (x, y), text, resource id, and/or parent and child UI element, etc. The app UI screen image capture service 330 returns any special meta data assigned to that UI element by the application to access specific application packages, configuration elements such as enable, exported and process, etc. Each user interaction may be associated with various amounts of system/services such as notification, battery, call, messages, etc., whose process has high system priority. The ILS 300 processing will gather the information such as application state, permissions, services and events that may be generated by an application on various actions to determine the context. Some of the events are filtered (e.g., via event processor/filter 373) or have their sequences altered to generate the task bytecode 380.

In some embodiments, the application state is determined based on the current application screen (e.g., called 'activity' in ANDROID®), which loads from multiple states such as create, resume or start. The application can start in any of the states as previously described, depending on previous user interaction with the application. If an application was not executing in the background, it is invoked as a new application process, 'create' state, which is the default state of the application, for which all UI elements and resources (database, services, receivers) are instantiated into memory. If the user interacted with an application before demonstrating a new task, the application remains executing in the background, which is 'activity saved instance' state or a 'persistent' state. In some applications (e.g., FACEBOOK®, TWITTER®, LIINKEDIN®, etc.), the screen UI elements change based on user action. For example, when a user scrolls down on the UI, new stories are rendered. When content in a window changes, the state of the window is changed as well. This helps identify the dynamic UI elements in the screen that are frequently changed by user actions. A window changed event helps identify an active screen when a user performed an action. A window content change event helps identify an active screen while the content of the screen changed, but the active screen does not change. An application loading from a saved state means that the user previously operated with some actions, but the application was not closed. As the application was still in memory, the screen data and/or application data that resulted from user actions or system responses was temporarily saved. When the user invokes or opens the application the next time, the application opens the previously closed state screen with all of the saved application data rather than the default screen activity. The data can be either be visible input by the user or non-visible data that resulted from user actions (e.g., click, select, etc.). When the application opens from a saved state, the application triggers an event called 'onActivitySaveInstanceState,' which is important to identify the application state while handling the window screen state. In one or more embodiments, the ILS 300 processing learns new tasks to fulfill a specific command of a user via demonstrations, generates executable task bytecode 380, filters unwanted actions/events generated by system/services with respect to context and state, provides dynamic sequencing of actions and partial task execution by state and context prediction, provides version compatibility of a task that can be performed on different versions of an application, etc. In some embodiments, learning a task is not limited to a single application, and ILS 300 processing can be applied for multiple applications to carry out single task.

Figure 14:
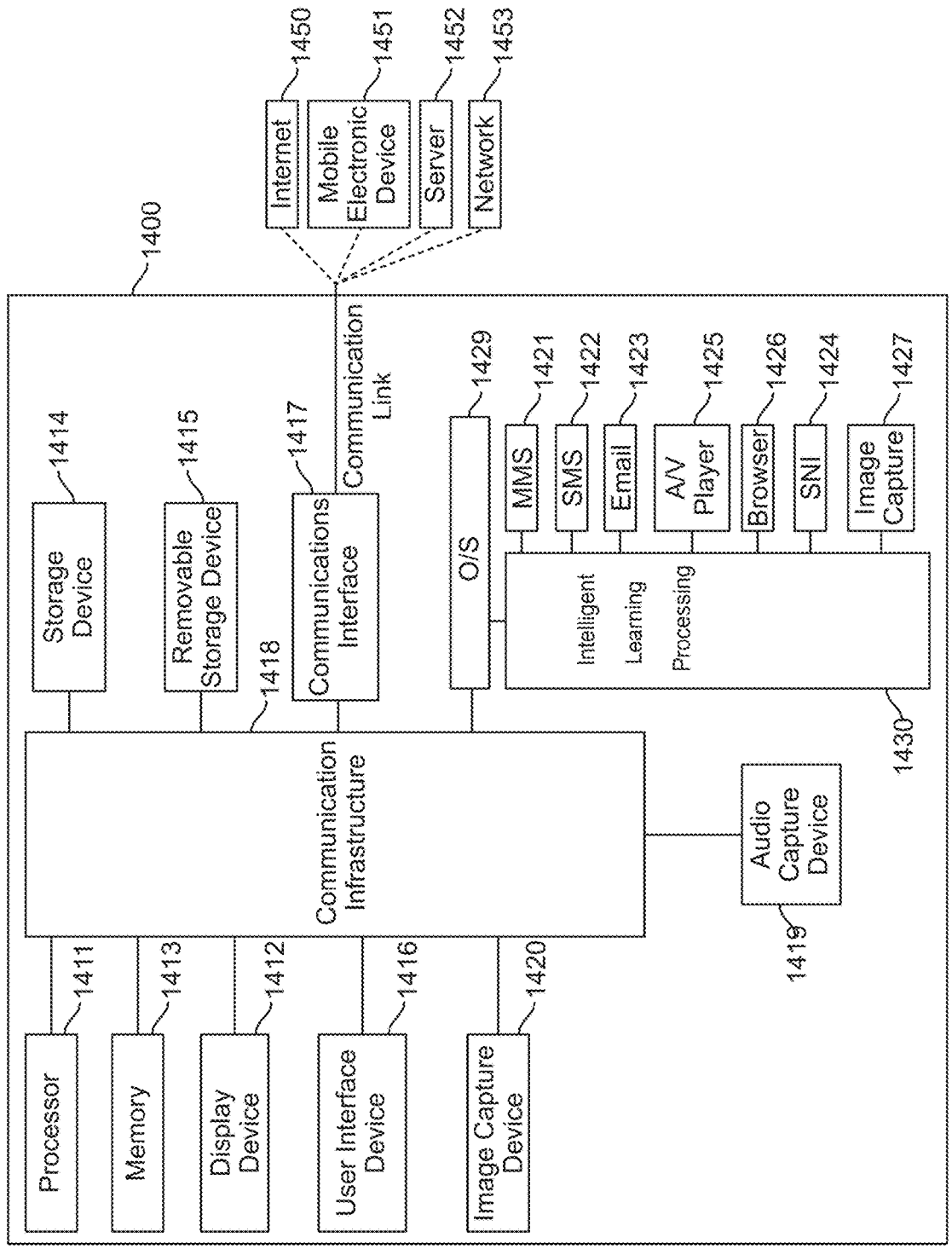
FIG. 14 is a high-level block diagram showing an information processing system comprising a computing system implementing one or more embodiments.

In some embodiments, the ILS 300 processing functions to generate task event queue 350 in the form of a task bytecode 380 to be executed by the system (e.g., system 100, FIG. 2, system 1400, FIG. 14, etc.). In one or more embodiments, the task bytecode 380 contains a sequence of semantic events, with each semantic event containing data providing a target UI element, values of input, priority in event sequence, whether it is a system feedback event, etc. Building the task bytecode 380 from an application has a challenge as adequate information of each user action, such as voice, gesture, or input event is required so that the task bytecode 380 can be performed on one or more devices (e.g., electronic devices 120, FIG. 2) and various versions of the applications.

Some of the challenges to generate the task bytecode 380 are dynamic states and event handling. Mobile system applications (developed on mobile OS platforms such as ANDROID®, TIZEN®, IOS®, etc.), in contrast to web apps (which run only in a browser), have context execution in order to utilize the system resources efficiently. Each such system application is controlled by a few system services such as a UI engine, memory, connectivity, graphics rendering, security and others, which produce dynamic and unpredicted events, states and various data values for each event. Mobile system applications run in whole device context controlled by system services to effectively use and share resources among the applications when device context changes. In some embodiments, the ILS 300 processing understands each system state and is aware of the context when carries out task learning. All the events generated by user actions are validated based on application package of the event, type of the event and/or the context of event which was dynamic based on multiple data elements. The events are processed as valid when they are generated by a current active application package where the task is learning and other events will be filtered out as not relevant or are system or external application events that are running in background, to generate the task bytecode 380.

In some embodiments, the UI of mobile application 310 is constructed similar to a document object model (DOM) tree. Due to small screen size (e.g., of a mobile device), a task may span over a few UI screens, and each screen contains UI elements in the tree. The UI elements are categorized based on their functionality, visibility and accessibility such as button, TextView, EditText, ListView, etc. To construct a single task, there are fewer or more UI operations included in a single or in multiple screens. The user actions 315, which generates the events, are processed in multiple stages to generate task bytecode 380. For example, the events are validated by Event validator 340 and filtered by Event processor/Filter 373 based on package, data and semantics. The events are prioritized to build performable actions and feedback events. In some embodiments, such stages are important to handle event filtering.

In some embodiments, the ILS 300 processing generates the executable task bytecode 380 without following a regular development process such as coding, compiling and debugging. The ILS 300 processing understands each user UI action sequentially with available data on each user action 315. The ILS 300 processing preprocesses the user actions 315 or generated events based on system, service and context of the task by semantically classifying a sequence of UI elements such as text and/or icon image and the data of such UI elements such as type, description, possible actions, etc. The ILS 300 processing generates a task bytecode 380 which is a collection of actions that can be performed automatically like user actions along with feedback events, which help ensure completion state of each action that runs on an application 310 when user initiates a task with voice command with multiple data values.

In some embodiments, the ILS 300 processing learns a task as follows. Upon understanding that the user will demonstrate a task by interacting with application 310, the ILS service 320 starts learning the task by capturing application package information that includes data of the package such as name, permission, data providers, services, activities (UI screens), hardware features, etc. associated with application 310. In an ANDROID® OS, such package information can be obtained using platform APIs such as PackageManager( ).getPackageInfo). The app UI screen image capture service 330 captures current active screen of visible UI element that are visible to the user and extracts text and icon image of such UI element. User actions 315 records user UI actions, extracts the user actions 315 information (e.g., event, status, text, image or icon data, etc.) and the UI element tree semantic miner 360 generates a hierarchical tree of UI elements based on how the elements are placed in each screen by extracting each element data as text, resource id, position, description and parent and child elements. The event metadata extractor 345 extracts metadata such as UI element type, position of the UI element, appeared text or image, hidden description, time stamp, etc. from the user actions 315 information. The task event queue 350 queues user action event information for bytecode processing 370. The bytecode processing 370 obtains input from the task event queue 350 and the UI element tree semantic miner 360. The event processor/filter 373 eliminates system, service and out of context events to make a task more precise and accurate. System events include announcements, warnings, hardware state change events such as Wi-Fi connection change, etc., and service events of other applications that are running in the background. The non-context events are mostly non active package events which are generated by system or other package/application's background services which are not a direct result of user action(s) performed on the applications. For example, while learning a "Send SMS" task, a SMS is received when the user is demonstrating an action. The received SMS is marked as an out of context event. Semantic ontology 372 performs recognition on each data element of the event generated from the user action such as text, image and type of UI element, possible input data to generate a semantic ontology of all user actions or events. If some of the data elements do not have adequate information for semantic understanding, the task queue bytecode processing 371 adds additional data/description based on voice, gesture or text input on such specific data elements. The event validator 340 validates each user action 315, based on each event generated application package, type of the event and current context events which are dynamic based on data from a user action or a system feedback event. If the ILS 300 processing does not understand a specific user action, it prompts the user for help. In one embodiment, the bytecode processing 370 generates a sequential event bytecode executable task in 'protocol buffers' format, which is a language-neutral and platform-neutral extensible mechanism for serializing structured data that can run on an application. The protocol buffers can be encoded and decoded in byte code using multiple computer languages. It helps to learn a task from one application on one device and execute the task on another device. In some embodiments, no input of voice data or text data by the user is needed while training the task. Almost all of the data is gathered from the source application, where the task was demonstrated, for understanding and semantically classifying each user action and element that the user performed.

Figure 4:
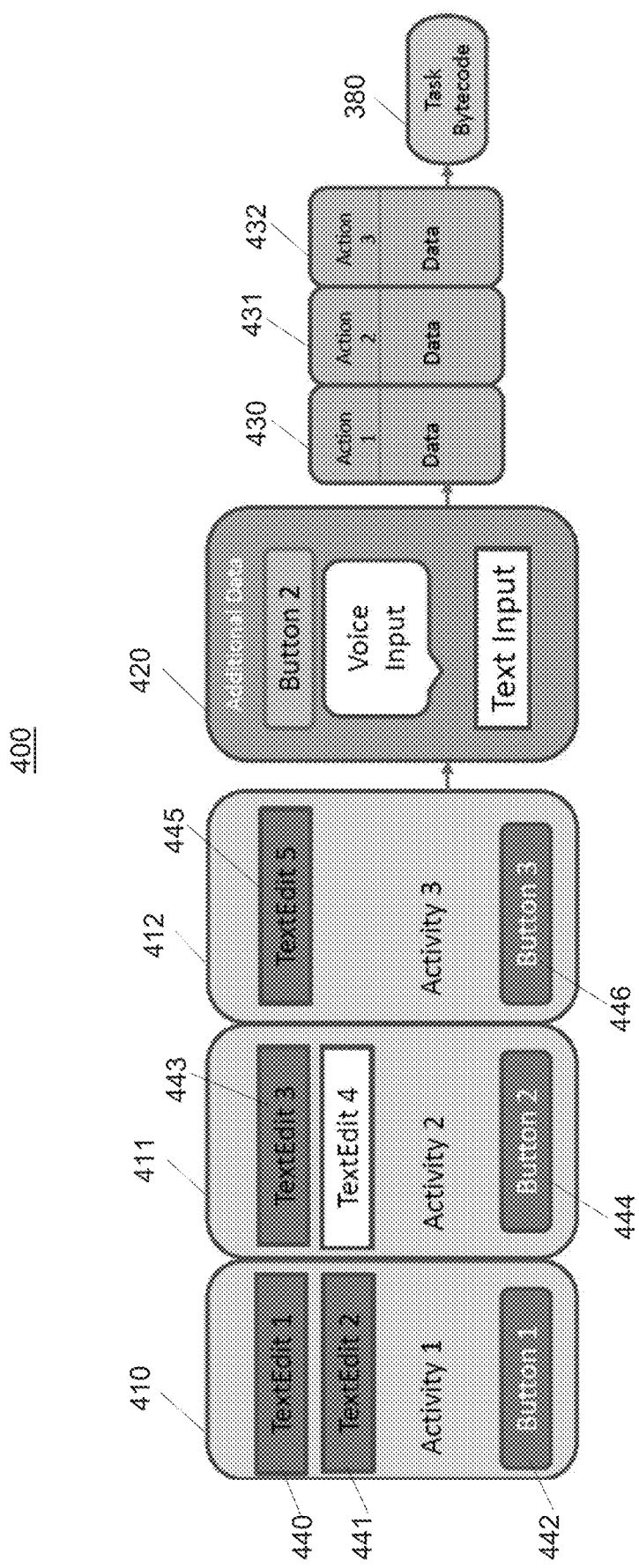
FIG. 4 shows an example flow of an application for user task demonstration (using simple steps), according to some embodiments.

FIG. 4 shows an example flow 400 of an application for user task demonstration, according to some embodiments. The example flow includes a series of screens 410, 411, 412 and UI element activities 440, 441, 442, 443, 444, 445 and 446. The flow 400 uses ILS 300 processing (FIG. 3) to learn the user task, according to some embodiments. Task learning generates the task bytecode 380 based on a series of actions demonstrated by the user on a single application or multiple applications. Each user interaction (e.g., user actions 315, FIG. 3) generates one or multiple events containing various data, states and context, which help classify the user action in order to generate the task execution sequence. The UI element activities 440, 441, 442, 443, 444, 445 and 446 are demonstrated with user actions on each screen 410, 411 and 412. For these user actions, the user inputs some text (UI element activities 440, 441, 443 and 445), and clicked a button (UI element activities 442, 444 and 446) to navigate from one screen to the next. In the background, the ILS 300 processing captures data of the user actions and processes them semantically. The screen 420 prompts the user for input, via voice and/or text, if some of the user actions or UI element activities do not have adequate information to be processed semantically. After the user completes interaction with the screen 420, events generated by user actions 430, 431 and 432 are processed by the ILS 300 processing to form the task bytecode 380.

Figure 5:
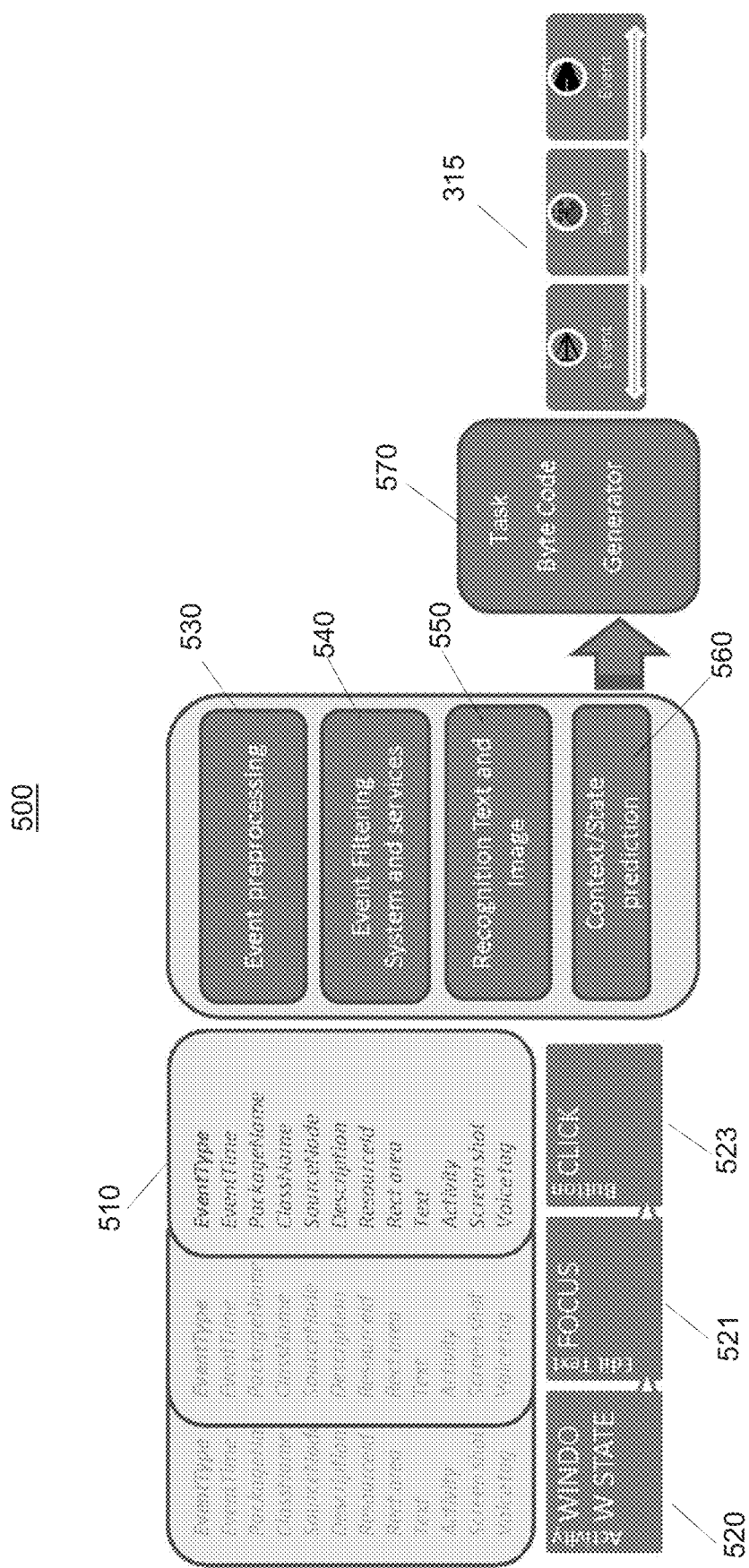
FIG. 5 shows a high-level component flow for ILS filtering unwanted events from system and services, according to some embodiments.

FIG. 5 shows a high-level component flow of 500 illustrating ILS 300 processing filtering unwanted system and services events using the event processor/filter 373, according to some embodiments. Environment of app 310 (FIG. 3) was highly dynamic and context aware. When a user performs a specific action (e.g., interaction with the app 310, an entry, a voice command, etc.), the ILS 300 processing generates numerous information (e.g., a response to an action, a prompt for information, etc.) that corresponds to user action. Each user action can generate one or more events. ILS 300 processing effectively works to eliminate or reorder event(s) based on priority. Some of the events are used to validate the action by ILS service 320 processing.

In some embodiments, the flow 500 includes extracted event metadata information 510, user actions 315 and system generated events. When the user demonstrates the task, information including activity window state 520, edit text focus 521 (when the user tries to input some text) and states saved, such as navigating to next screen or submitting the input data with a button click 523, is obtained. The ILS 300 processing in the flow 500 includes event preprocessing 530, a component at which all events are checked for necessary data captured (such as text and image), and at which all events in a raw event queue are saved in memory to create temporary copies for further processing. If any information is missed or is inadequate, flow 500 prompts (e.g., in screen 420, FIG. 4) the user with specific elements to enable the user to input data in voice or text. The ILS 300 processing in the flow 500 also includes event filtering for system and services 540 that processes and filters unwanted services and system events, recognition of text and image 550 that generates a semantic ontology for each event that is generated by user action, and context/state prediction 560 that identifies what kind of context is required to carry out these action once formed as a task bytecode 380 (FIGS. 3 and 4) such as permissions, hardware requirements, other services interface, etc. The task bytecode generator 570 combines the information from the event preprocessing 530, the event filtering for system and services 540, the recognition of text and image 550 and the context/state prediction 560, with user actions 315, and converts information in protocol buffer format (which can be executed and deployable to any system to generate the task bytecode 380), in one embodiment.

Figure 6:
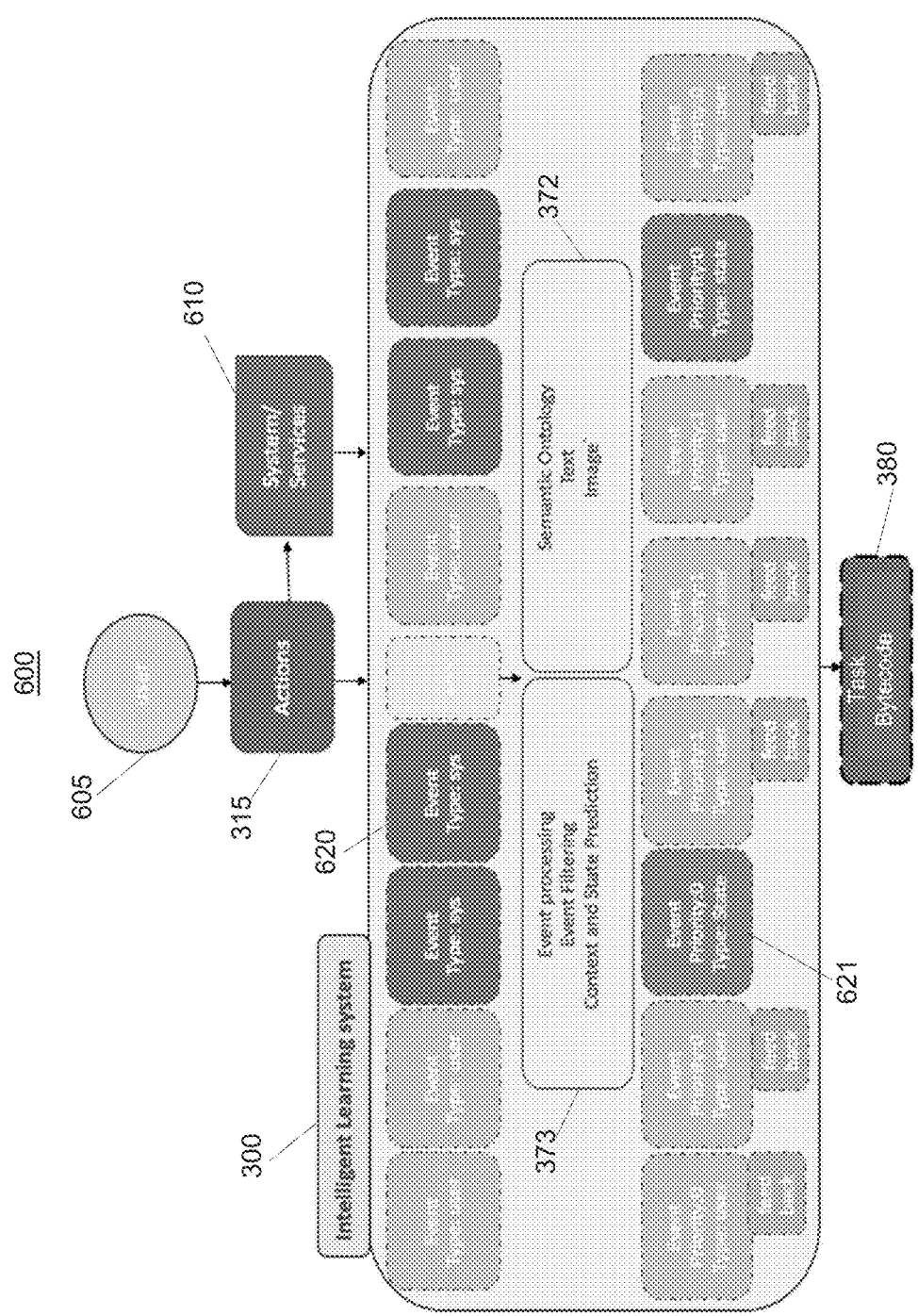
FIG. 6 shows a high-level flow for an ILS process performing dynamic event sequencing by filtering events based on package, data such as icon, text and description, and semantics, and prioritizing the events and text/image semantic ontology, according to some embodiments.

FIG. 6 shows a high-level flow 600 for an ILS 300 process performing dynamic event sequencing by filtering events based on package, data such as icon, text and description, and semantics, and prioritizing the events and text/image semantic ontology, according to some embodiments. When a task is learned on one version of an application with specific amount of mandatory data to complete the task, the learned task may not be carried out on other versions of the application that are not known to the ILS 300. ILS 300 works on semantic understanding of the task and resource IDs of the task. For example, if the application screen changed or added more UI elements, the ILS 300 can carry out the task using the "resource ID," which are unique for UI elements. Even if the UI elements are changed, as long as the resource ID are the same, the task can still be executed. If the resource ID of the UI elements are also changed, the ILS 300 matches a semantically close UI element to the learned element to carry out the action. For example, one task is learned to send a message with "contact," "text" data elements and "send" action. In the next version of the application, the UI elements are changed and marked as "recipient," "message," and an icon button representing the send action. The domain text classifier which generates semantic ontology 372 detects the closest element to "contact" as "recipient" and "text" as "message" in the updated version of the application. The ILS 300 generates the task bytecode 380 using semantic ontology that helps to execute the tasks for either forward or backward versions.

In some embodiments, the ILS 300 processing generates the events by semantically understanding the priority. The flow 600 obtains user 605 actions 315 and filters system/services events 610 using the event processor/filter 373 (FIG. 3). The event processor/filter 373 works to identify the events that are generated by user actions. The event processor/filter 373 processes events with multiple levels of validating and filtering based on the event information, such as event type 620, event priority 621, and package type. Some similar events may be generated based on a single action. For example, when a user touches on EditText UI control, the system will generate two events such as "event_click" and "event_focus." However, to re-perform the user touch action, only one event is needed. Therefore, the event processor/filter 373 will filter out "event_focus" and keep "event_click." In some applications (for example, TWITTER®, LINKEDIN® and FACEBOOK®), there may be a lot of dynamic data loading when the application starts. The dynamic data, such as 'event scroll' and 'event select,' is generated without any user action. Those events are generated by the application package but are not contextually relevant. Therefore, these events will be filtered out and subsequent events will change their position in the task queue. Context prediction is the state of the application process when the application is active and running. When an application is running, not all the resources used to complete the task will run in the same context. For example, databases, hardware resources, accessing application controls/UI elements may have their own application context. Context prediction 560 identifies whether the specific resource runs in application context or system context, which helps keep the task execution intact by acquiring appropriate context. Semantic ontology processing 372 is performed to mine all the elements that are presented in the current active screen of the application. The semantic ontology processing 372 generates complete sematic data of all elements from text, resource ID, description, position and actions that can perform along with on screen text and icon image of the UI element.

Figure 7:
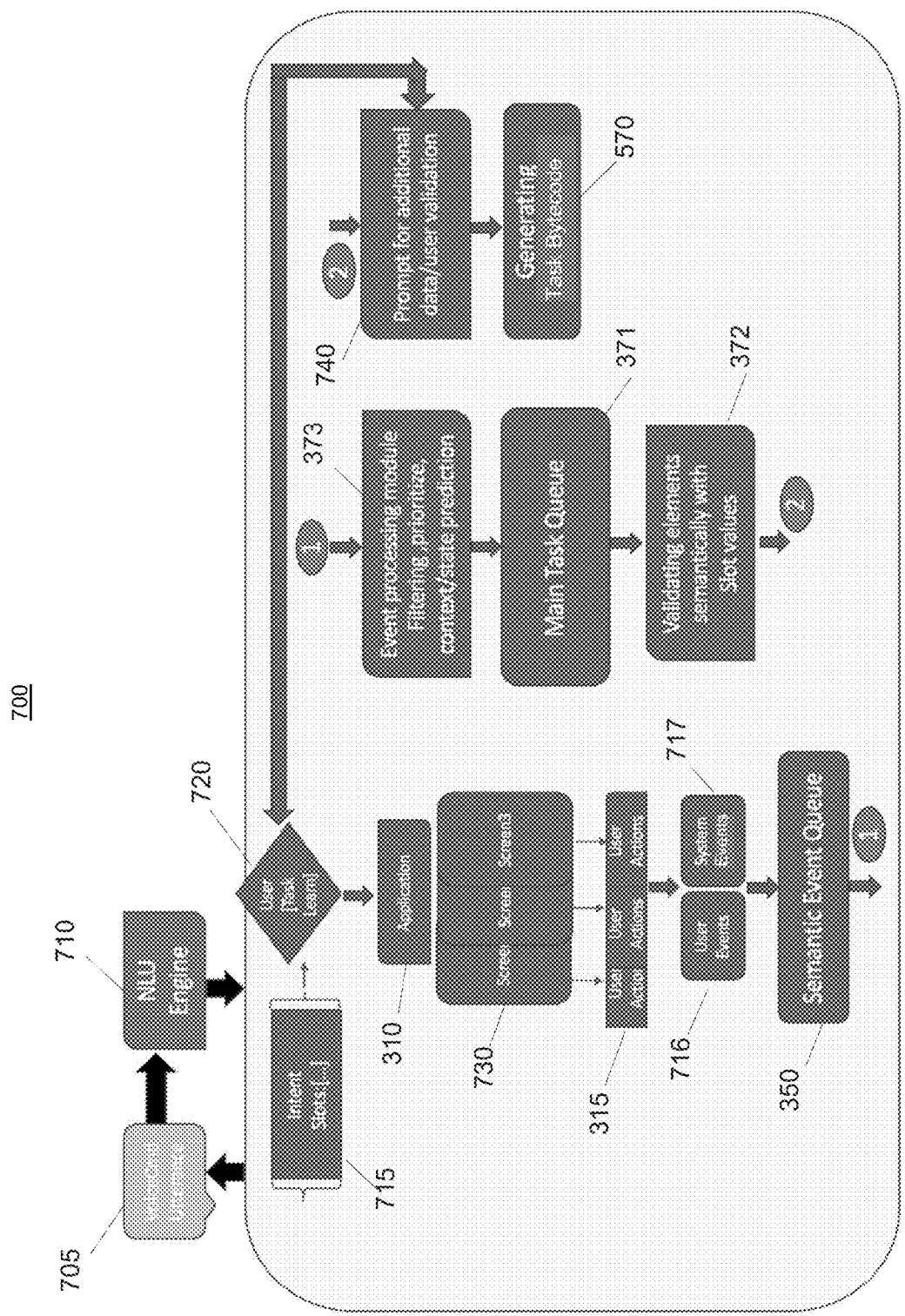
FIG. 7 shows an example process flow diagram for ILS task learning on a single application, according to some embodiments.

FIG. 7 shows an example process flow 700 diagram for ILS task learning on a single application, according to some embodiments. In some embodiments, the ILS 300 processing (FIG. 3) learns how to perform a task via demonstration; enabling an ordinary end user to teach an intelligent agent to perform a task that he/she wants/prefers. In some embodiments, a voice command utterance 705 provided by a user is processed by a natural language understanding (NLU) engine 710 (e.g., of a PA, virtual assistant, etc.). The output from the NLU engine 710 provides intent and slot information of the voice command in intent slots 715. Intents are the intentions of the end-user conveyed to perform some specific tasks. The intents help identify the application that may be used to perform the task of that intent, such as "book a flight," "order a pizza," "play a video," etc. To carry out each intent, an electronic device (e.g., electronic device 120, FIG. 2) chooses a specific application from available applications (e.g., applications 1-N 127, FIG. 2). The slots are variable values to perform a task for user intent, for an example utterance of "book a flight to New York on January 12," the portion "book a flight" is an intent and "New York" and "January 12" are the slots.

In some embodiments, the user (task learn) determination 720 provides information about which application is suitable to perform this task from the available applications in the electronic device. If there is not a specific application installed in the electronic device, the user is prompted to install an application or if more than one application exists, the user is prompted to choose a suitable application to learn the task for the application 310 (see also, FIG. 3). A specific application may also be selected for the user based on application package information, usage history, ranking of the applications, etc. The various screens 730 of the electronic device and user actions 315 are used to determine user events 716, which are caused only by user actions, and system events 717 that are accompanying the user actions. For example, the system events 717 may include timely system events such as announcements or events from other applications/service, battery low, key board inputs, etc. All of these events collectively are added to the semantic event queue or raw event queue 350. The event processor/filter 373 filters and prioritizes events in the semantic event queue 350, performs context/state prediction, and the output is added to the main task queue 371. The semantic ontology processing 372 semantically validates based on a predefined set of values that are manually constructed. The possible values are extracted from multiple applications for various scenarios of UI elements. In one example, the send button has a possible semantic meaning such as post, tweet, submit, done, etc. These values are manually constructed or algorithmically constructed by collecting data from a large set of applications. The constructed data values are used to validate slot values given by the NLU engine 710. In one example, for the voice command "send SMS to Mom as running late," there are two slot values as Mom (phone number from contacts) and the text 'running late' required to complete the task. The ILS action validator 340 validates if the user demonstrated or the system correctly processed the required slots to carry out the task at any time. At block 740 the user is prompted for additional data or user validation. Once the task is validated, the task bytecode generator 570 generates the task bytecode 380. In some embodiments, the ILS 300 processing for a single application may be used for various tasks, such as booking a flight, finding places (e.g., restaurants, places, hotels, stores, etc.), etc. For example EXPEDIA® can carry different tasks such as 'booking hotel,' 'booking flight,' 'booking car,' and "find nearby attractions." If multiple users demonstrated different tasks on the same application, additional user validation may be required to carry out the task to avoid ambiguity in task execution.

Figure 8:
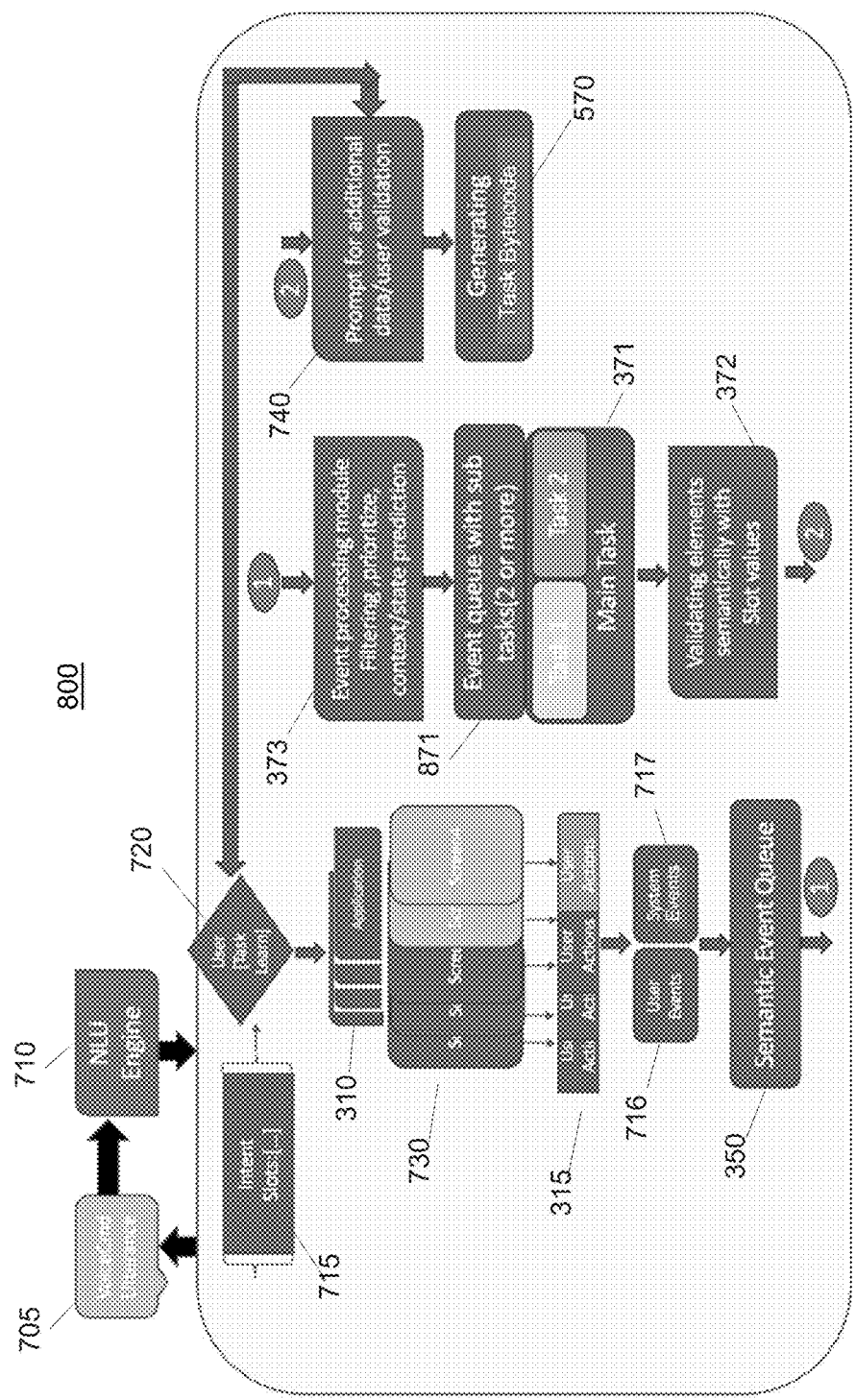
FIG. 8 shows another example process flow diagram for ILS task learning on more than a single application, according to some embodiments.
Figures 9A, 9B, 9C, 9D:
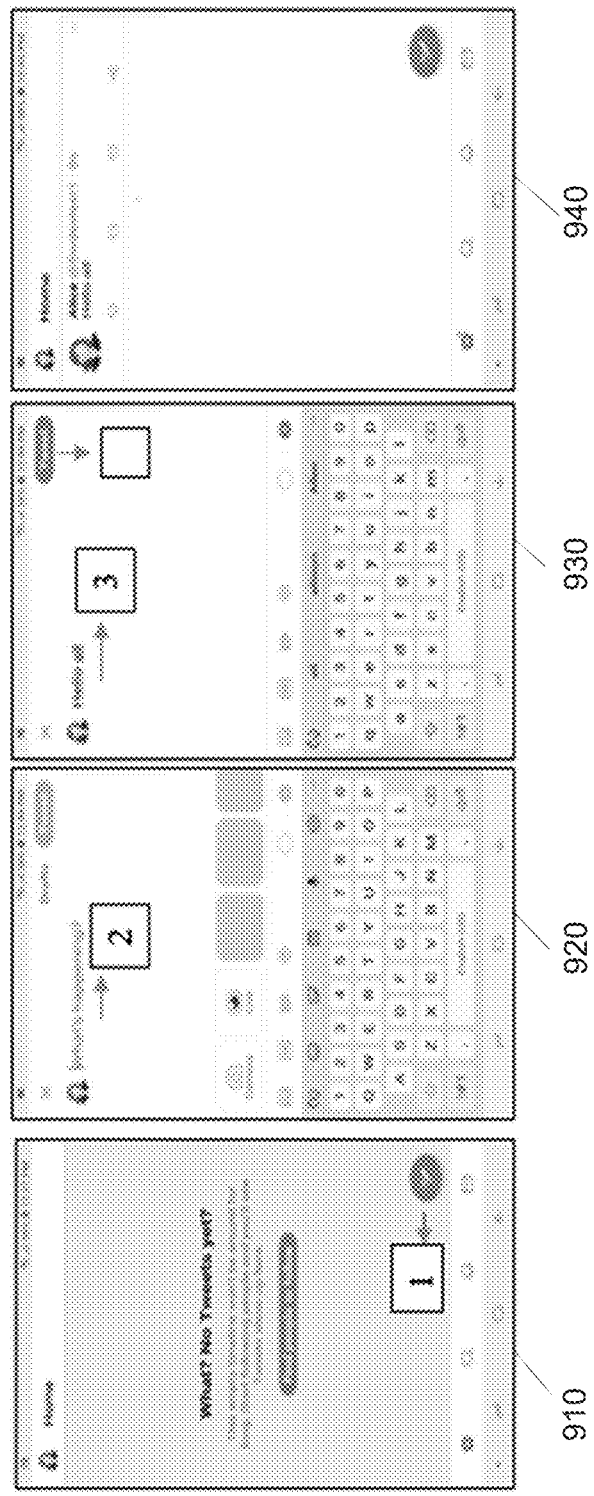
FIGS. 9A-D show an example of learning a posting on a TWITTER® application, according to some embodiments.

FIG. 8 shows another example process flow 800 diagram for ILS task learning on more than a single application, according to some embodiments. In some embodiments, a voice command utterance 705 is processed by the NLU engine 710 (see also, FIG. 7). The output from the NLU engine 710 provides intent and slot information in intent slots 715, as described above. The user (task learn) determination 720 identifies the applications 310 (see also, FIG. 3), as described above. The various screens 730 of the electronic device and user actions 315 are used to determine user events 716, which includes both events caused by only user actions, and system events 717 accompanying user actions. All these events collectively are added to the semantic event queue or raw event queue 350. The event processor/filter 373 processes events, filters, prioritizes and performs context/state prediction. The event queue with sub-tasks (e.g., 2 or more) 871 is formed based on the application involved in the whole task demonstration process. If, for example, the user has interacted with application 1 and application 2 during a demonstration process, the actions from application 1 are formed as one sub-task and the actions from application 2 as a second sub-task. These actions can be categorized based on the application package ID using the package manager (as described above), and the output is added to the main task queue 371. The semantic ontology processing 372 validates elements semantically based on a predefined set of values, as described above. The ILS action validator 372 validates that the user demonstrated or the electronic device processed correctly the required slots to carry out the task at any time. At block 740 the user is prompted for additional data or user validation. Once the task is validated, the task bytecode generator 570 generates the task bytecode 380. In some embodiments, the ILS 300 processing for multiple applications may be used for various tasks, such as finding particular places in a particular area (e.g., a particular type of place in a particular location (e.g., finding Korean BBQ restaurants in Palo Alto, Calif.), sharing photos in the cloud for a particular trip, etc.

FIGS. 9A-D show an example of learning a posting on a TWITTER® application, according to some embodiments. In this example embodiment, the ILS 300 processing (FIG. 3) is learning "add a new tweet" task involving a TWITTER® application. Screen 1 910 shows "create tweet," screen 2 920 is for adding a message and tweet. To learn this task in the TWITTER® application in two screens, the first screen (screen 1 910) records the user starting a 'new tweet', and the second screen (screen 2 920) captures user input and action 'button click' performed 'tweet' in the screen 3 930. The user actions are traced programmatically by each event, data and UI elements. These corresponding events are dynamic and state changing events, which lead to generation of multiple supplemental events and notifications. Typically, for each task, the total number of events generated is almost three times the user performed actions, which give deep insights of the event as to how it is interacting with UI elements. The ILS 300 processing captures UI elements class, events generated by user action, text, element coordinates along with each activity screen, each UI element image to understand semantically each user action. The ILS 300 processing understands each activity screen that is invoked as a part of the task learning, and mines the data of a UI element tree for each activity screen. The semantic tree data along with the events generated by the user demonstration are stored in the task event queue 350 (FIG. 3) for further semantic ontology processing in the bytecode processing 370 (FIG. 3). In the example, screen 3 930 provides recipient information for the tweet and screen 4 940 shows the tweet.

In some embodiments, interim input prompts are issued for additional data. Natural language instruction is a universal medium for humans to teach each other new tasks. For a PA or smart agent to learn from such instructions, a significant challenge is grounding—the agent needs to extract semantic meanings from teachings and associate them with actions and perceptions. If a specific UI element had inadequate information, the ILS 300 processing inputs simple natural language instructions further to infer data for classifying a semantic meaning. In some embodiments, a keyword-based instruction is used to elaborate the action, item or description to infer data more accurately. The ILS 300 processing provides prompts, as hints, to an electronic device's screen for possible semantic category of information.

In some embodiments, the ILS 300 processing robustly processes and filters events by understanding the context. One embodiment uses a key-map event classifier, which is a predefined set of values that is manually constructed. The possible values are extracted from multiple applications for various scenarios of UI elements. In one example, a send button has multiple possible semantic meanings such as post, tweet, submit, done, etc. These values are manually constructed or algorithmically constructed by collecting data from a large set of applications. The App UI screen image capture service 330 (FIG. 3) and UI element tree semantic miner 360 are used to understand each of the UI elements and their respective actions demonstrated by the user. The event processor/filter 373 (FIG. 3) extracts information from the task event queue 350 (FIG. 3) and validates and filters unwanted events using the key-map event classifier. The key-map event classifier classifies system events based on data such as application package, application type and context, and information that is out of context for the task learning application is filtered. Events such as 'windows change,' notifications, announcements, etc. are filtered. But other events generated by a system such as 'window state change' are used in task learning for activity change state or context change state in a task learning process. After processing events, semantic ontology 372 (FIG. 3) is followed to generate semantic ontology based on the text and images of the UI elements captured during user demonstration.

In some embodiments, the ILS 300 processing for events works on various metadata (extracted by the event metadata extractor 345 (FIG. 3)) for each different task. For example, to remove all system events from the task event queue 350, the ILS 300 processing identifies the package name of the event source. For example, in SAMSUNG® mobile devices, the package names not limited to "com.samsung.android.app.aodservice," "com.sec.android.app.launcher" and "com.samsung.android.MtpApplication" are classified as system packages and are filtered. Listed below are example events that are captured to post a tweet on a TWITTER® application.

Σ1:EventType: TYPE_VIEW_FOCUSED; EventTime: 310865; PackageName: com.twitter.android; MovementGranularity: 0; Action: 0 [ClassName: android.support.v7.widget.RecyclerView; Text: [•]; ContentDescription: null; ItemCount: 1; CurrentItemIndex: −1; IsEnabled: true; IsPassword: false; IsChecked: false; IsFullScreen: false; Scrollable: false; BeforeText: null; FromIndex: 0; ToIndex: 0; ScrollX: −1; ScrollY: −1; MaxScrollX: −1; MaxScrollY: −1; AddedCount: −1; RemovedCount: −1; ParcelableData: null]; recordCount: 0

Σ2:EventType: TYPE_VIEW_FOCUSED; EventTime: 310916; PackageName: com.twitter.android; MovementGranularity: 0; Action: 0 [ClassName: android.support.v7.widget.RecyclerView; Text: [•]; ContentDescription: Home timeline list; ItemCount: 6; CurrentItemIndex: 0; IsEnabled: true; IsPassword: false; IsChecked: false; IsFullScreen: false; Scrollable: false; BeforeText: null; FromIndex: −1; ToIndex: −1; ScrollX: −1; ScrollY: −1; MaxScrollX: −1; MaxScrollY: −1; AddedCount: −1; RemovedCount: −1; ParcelableData: null]; recordCount: 0

Σ3:EventType: TYPE_VIEW_SCROLLED; EventTime: 311238; PackageName: com.twitter.android; MovementGranularity: 0; Action: 0 [ClassName: android.support.v7.widget.RecyclerView; Text: [ ]; ContentDescription: null; ItemCount: 1; CurrentItemIndex: −1; IsEnabled: true; IsPassword: false; IsChecked: false; IsFullScreen: false; Scrollable: false; BeforeText: null; FromIndex: 0; ToIndex: 0; ScrollX: −1; ScrollY: −1; MaxScrollX: −1; MaxScrollY: −1; AddedCount: −1; RemovedCount: −1; ParcelableData: null]; recordCount: 0

Σ4:EventType: TYPE_WINDOW_STATE_CHANGED; EventTime: 312329; PackageName: com.samsung.android.MtpApplication; MovementGranularity: 0; Action: 0 [ClassName: com.samsung.android.MtpApplication.USBConnection; Text: [MTP application]; ContentDescription: null; ItemCount: −1; CurrentItemIndex: −1; IsEnabled: true; IsPassword: false; IsChecked: false; IsFullScreen: false; Scrollable: false; BeforeText: null; FromIndex: −1; ToIndex: −1; ScrollX: −1; ScrollY: −1; MaxScrollX: −1; MaxScrollY: −1; AddedCount: −1; RemovedCount: −1; ParcelableData: null]; recordCount: 0

Σ5:EventType: TYPE_VIEW_CLICKED; EventTime: 322105; PackageName: com.samsung.android.MtpApplication; MovementGranularity: 0; Action: 0 [ClassName: android.widget.Button; Text: [OK]; ContentDescription: null; ItemCount: −1; CurrentItemIndex: −1; IsEnabled: true; IsPassword: false; IsChecked: false; IsFullScreen: false; Scrollable: false; BeforeText: null; FromIndex: −1; ToIndex: −1; ScrollX: −1; ScrollY: −1;

MaxScrollX: −1; MaxScrollY: −1; AddedCount: −1; RemovedCount: −1; ParcelableData: null]; recordCount: 0

Σ6:EventType: TYPE_WINDOW_STATE_CHANGED; EventTime: 322170; PackageName: com.twitter.android; MovementGranularity: 0; Action: 0 [ClassName: com.twitter.app.main.MainActivity; Text: [Home]; ContentDescription: null; ItemCount: −1; CurrentItemIndex: −1; IsEnabled: true; IsPassword: false; IsChecked: false; IsFullScreen: true; Scrollable: false; BeforeText: null; FromIndex: −1; ToIndex: −1; ScrollX: −1; ScrollY: −1; MaxScrollX: −1; MaxScrollY: −1; AddedCount: −1; RemovedCount: −1; ParcelableData: null]; recordCount: 0

In this example, Event Σ2 will be filtered because Σ1 and Σ2 are duplicates, which is determined based on the parameters: type of event, package and class names, etc. (e.g., EventType: TYPE_VIEW_FOCUSED; PackageName: com.twitter.android; ClassName: android.support.v7.widget.RecyclerView). Both events are generated by the system when a 'twitter' application is opened by user. Event Σ3 will not be filtered, which is determined based on package name and nonexistence of duplicate. Events Σ4 and Σ5 are system events, which are identified by package names (e.g., PackageName: com.samsung.android.MtpApplication, a package that is proprietary to SAMSUNG® mobile devices with USB connectivity), and thus are filtered. Event Σ6 is a main event and will not be filtered. In this example, note that a new screen is opened from the application with help of EventType: TYPE_WINDOW_STATE_CHANGED from PackageName: com.twitter.android.

In some embodiments, the event processor/filter 373 may be customized for a system, such as for SAMSUNG® and GOOGLE® ANDROID® OS, to specifically recognize various system events and application events to process and filter based on metadata information.

In some embodiments, the task file (task bytecode 380) is a 'bytecode file,' which includes a series of user actions, metadata information and semantic data that is used to understand each UI element category. Metadata information helps carry out a task on the application of the same or different version. When an application version changes, the UI elements may change as well. In one example, a task is learned for an older version of an application, and the user demonstrated one action on, for example, a 'Button.' In the new version of the application, the Button UI element is replaced with an 'Image Button' UI element such that the source and target UI elements are not the same. Nonetheless, the system can still carry out the button click action by mapping semantic information using text, description and icon image if available. In some embodiments, the task file may be a 'json' data file that includes each action and feedback actions to act on the application. Usually a JSON file is open format, and anyone can change the action sequence using malware or a bot. In this case, the end of the task execution may be unpredictable and harmful to the user with unpredictable and unwanted actions. In some embodiments, JSON file is converted into a Protocol Buffer (with .pb file extension) file format, which is platform independent, uses less memory, is secure and faster than using a JSON file. Protocol Buffers are a way of serializing structured data in a binary format. It is useful in developing programs to communicate with each other over a wire or for storing data.

Figures 10A, 10B, 10C:
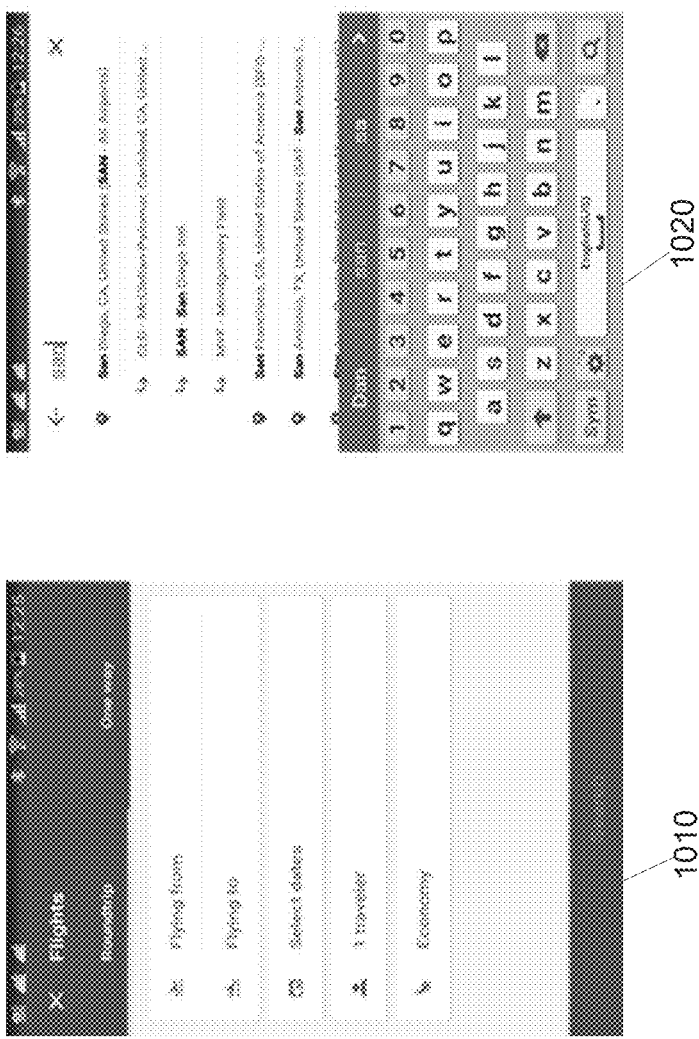
FIGS. 10A-C show an example of learning flight booking on an EXPEDIA® application, according to some embodiments.

FIGS. 10A-C show an example of learning flight booking on an EXPEDIA® application, according to some embodiments. Booking flight tickets is a task that can be completed on various applications such as EXPEDIA®, KAYAK®, PRICELINE®, BOOKING®, etc. In one embodiment, the ILS 300 processing (FIG. 3) learns the task, in response to a voice command, from an application, and executes the same application upon receipt of the same voice command. Flight booking can be a repetitive task. Typically, each user searches across different applications, adjusting dates and times for the best deals. Each user performs the task of comparing data for flights with the same dates and destination with various applications. In another embodiment, the learned task can be applied to different applications in the same category. For example, the first screen 1010 uses user input to start searching. The second screen 1020 shows a user starting to enter a destination with interim results shown for selection. The third screen 1030 shows that the user entered data will be used to search for flights. The ILS 300 processing (FIG. 3) repeats the task with multiple dates and changing parameters.

Figure 11C:
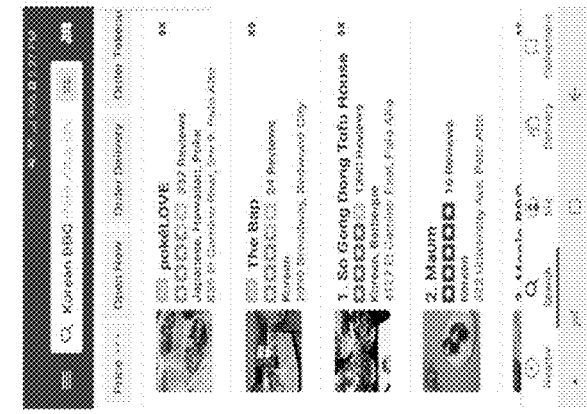
FIGS. 11A-C show an example of finding a restaurant on a YELP® application, according to some embodiments.
Figure 11B:
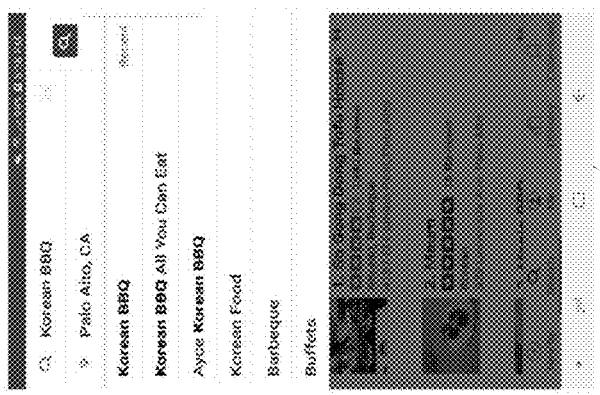
Figure 11A:
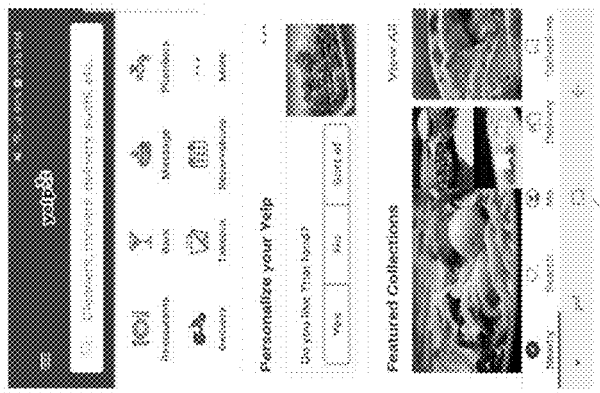

FIGS. 11A-C show an example of finding a restaurant on a YELP® application, according to some embodiments. Finding restaurants/places/hotels/stores, etc. may happen frequently while a user is driving or away from home. In some embodiments, the ILS 300 processing (FIG. 3) can learn the task of finding a restaurant from the application (e.g., YELP®), and can perform the learned task later while a user is in a moving car. The ILS 300 processing not only executes and finds the results, but will be read out (e.g., through a car sound system, through an electronic device 120 (FIG. 2), etc.), to the user based on the choices. In some embodiments, this task can be performed repeatedly by changing cuisine types for nearby places to find the best restaurant and/or hotels. The ILS 300 processing learns this task effectively to perform with various combinations of the cuisine and places. In some embodiments, when learning the task, the ILS 300 processing determines the total amount of input values needed to complete the task based on how many input UI elements exist in a given action sequence. The input elements may include edittext, listbox, drop down list etc. Therefore, when performing the task while missing any such input elements, the ILS 300 processing prompts (e.g., textual prompt, voice or sound prompt, etc.) the user for corresponding inputs to carry out the task. When the user instructs to perform task in voice command, the NLU engine (e.g., NLU engine 710, FIGS. 7-8) will identify how many input values exist in a voice command (such values are referred to as 'slots'). For example, in the TWITTER® application example described above, the user voice command is "post a tweet as I am on vacation." This voice command has an input value (slot) of "I am on vacation." If the user voice command is "post a tweet," there is no input value to post in text. So, when such a task is carried out, the system prompts for an input value to be posted.

In this example, the first screen 1110 is the starting point for using the application. The second screen 1120 shows a search page using Korean BBQ as the cuisine type and Palo Alto, Calif. as the location desired. The third screen 1130 shows the results of the search criteria from the second screen 1120.

Figure 12C:
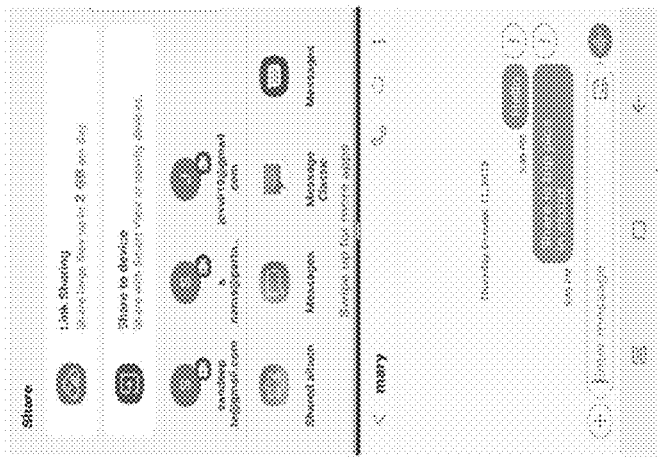
FIGS. 12A-C show an example of sharing trip pictures from a gallery to a cloud service, according to some embodiments.
Figure 12B:
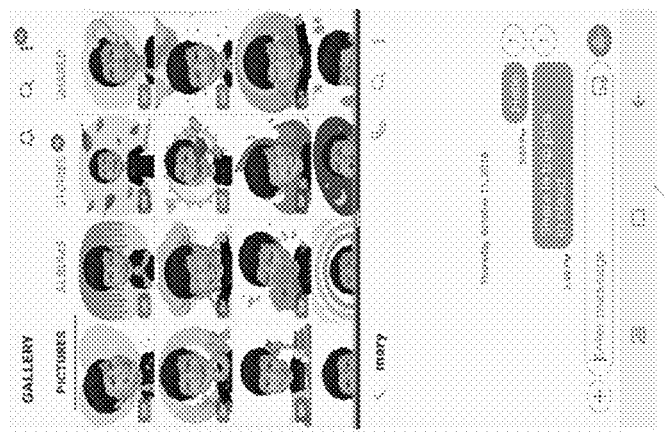
Figure 12A:
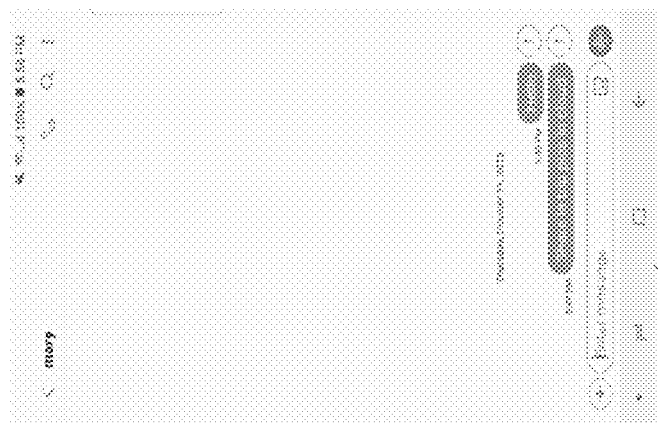

FIGS. 12A-C show an example of sharing trip pictures from a gallery to a cloud service, according to some embodiments. In this example, two users are participating in a conversation using a message (or chat) application where a first user sends a request for a second user to "Share la trip pics in cloud" (i.e., Share the photos of a Los Angeles trip from a gallery app in a cloud environment or app). For the second user to carry out the task, she has to leave the message application, search pictures from the gallery application, and then share the pictures using a cloud service such as SAMSUNG® Link, DROPBOX®, GOOGLE® Drive, etc. and then resume the conversation. The ILS 300 processing (FIG. 3) learns the task of sharing pictures from the gallery to the cloud service, and can perform the task automatically the next time without having to leave the conversation. The first screen 1210 shows the message application being used by the first and second user. The second screen 1220 shows an open gallery application for selecting pictures/photos. The third screen 1230 shows the cloud application for sharing the selected pictures.

Figure 13:
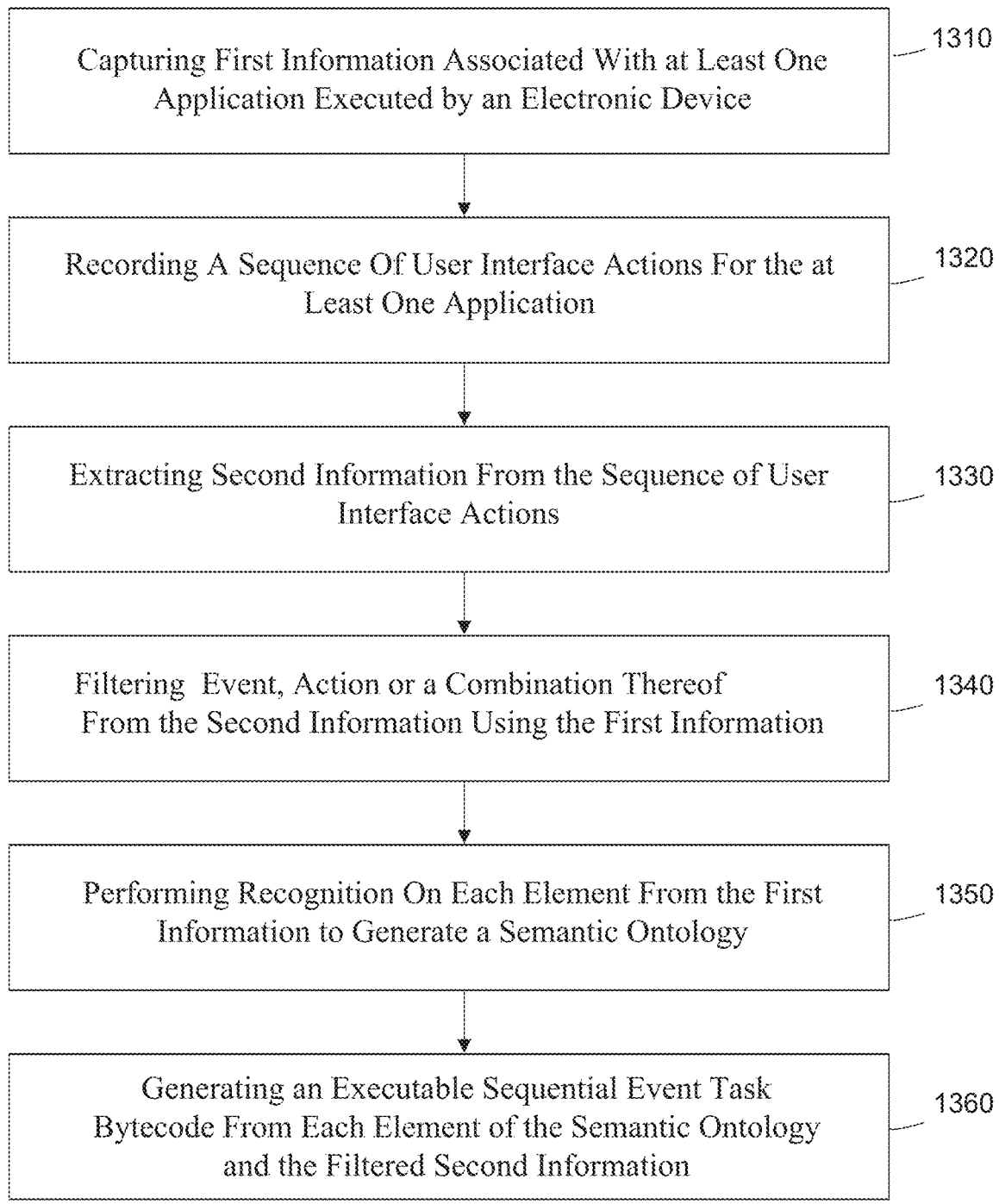
FIG. 13 shows a block diagram of a process for task learning, according to some embodiments.

FIG. 13 shows a block diagram of a process 1300 for learning a task, according to some embodiments. In some embodiments, in block 1310 process 1300 captures first information (e.g., information/data from one or more of a voice command utterance, information from a conversation or from context, etc.) associated with at least one application (e.g., app/application 310, FIG. 3) executed by an electronic device (e.g., electronic device 120, FIG. 2, system 1400, FIG. 14, etc.). In block 1320 process 1300 records a sequence of user interface (e.g., using input mechanism 124, FIG. 2) interactions (e.g., user actions 315, FIG. 3) for the at least one application. In block 1330 process 1300 extracts second information (e.g., at least one of system information or services information) from the sequence of user interface interactions. In block 1340 process 1300 filters (e.g., using event processor/filter 373, FIG. 3) (unwanted) event, action or a combination thereof from the second information using the first information, which are captured for every detail. In block 1350 process 1300 performs recognition (e.g., recognition of text and image 550, FIG. 5) on each element from the first information to generate a semantic ontology (e.g., via semantic ontology 372, FIG. 3). In block 1360 process 1300 generates an executable sequential event task bytecode (e.g., task bytecode 380, FIG. 3) from each element of the semantic ontology and the filtered second information.

In some embodiments, the second information is processed to understand context and states. In some embodiments, process 1300 may include extracting metadata (e.g., using event metadata extractor 345, FIG. 3) from the user interface interactions. The metadata and task information may be queued in a task event queue (e.g., task event queue 350, FIG. 3). Events, actions or a combination thereof may be filtered from the second information further based on the task event queue. In some embodiments, the task bytecode is configured to execute on the at least one application for performing the task.

In one or more embodiments, process 1300 may include adding additional voice or text data (e.g., additional data 420, FIG. 4) to each element of the sequence of user interface interactions to obtain additional metadata (e.g., using event validator 340).

In some embodiments, process 1300 may include preprocessing (e.g., using event preprocessing 530, FIG. 5) the user interface interactions based on system, service and out of context data for the task by classifying text, image and user interface elements.

In some embodiments, process 1300 may further include that the task bytecode is formulated to execute on the at least one application repeatedly based on user voice commands, and the task bytecode includes a sequence of semantic events using logical data that when executed carries out the task on the at least one application.

FIG. 14 is an exemplary high-level block diagram showing an information processing system comprising a computing system implementing one or more embodiments. The system 1400 includes one or more processors 1411 (e.g., ASIC, CPU, etc.), and may further include an electronic display device 1412 (for displaying graphics, text, and other data), a main memory 1413 (e.g., random access memory (RAM), cache devices, etc.), storage device 1414 (e.g., hard disk drive), removable storage device 1415 (e.g., removable storage drive, removable memory, a magnetic tape drive, optical disk drive, computer-readable medium having stored therein computer software and/or data), user interface device 1416 (e.g., keyboard, touch screen, keypad, pointing device), and a communication interface 1417 (e.g., modem, wireless transceiver (such as Wi-Fi, Cellular), a network interface (such as an Ethernet card), a communications port, or a PCMCIA slot and card).

The communication interface 1417 allows software and data to be transferred between the computer system and external devices through the Internet 1450, mobile electronic device 1451, a server 1452, a network 1453, etc. The system 1400 further includes a communications infrastructure 1418 (e.g., a communications bus, cross bar, or network) to which the aforementioned devices 1411 through 1417 are connected.

The information transferred via communications interface 1417 may be in the form of signals such as electronic, electromagnetic, optical, or other signals capable of being received by communications interface 1417, via a communication link that carries signals and may be implemented using wire or cable, fiber optics, a phone line, a cellular phone link, a radio frequency (RF) link, and/or other communication channels.

In one implementation of one or more embodiments in an electronic device (e.g., electronic device 120, FIG. 2), the system 1400 further includes an image capture device 1420, such as a camera 128 (FIG. 2), and an audio capture device 1419, such as a microphone 122 (FIG. 2). The system 1400 may further include application processing or processors as MMS 1421, SMS 1422, email 1423, social network interface (SNI) 1424, audio/video (AV) player 1425, web browser 1426, image capture 1427, etc.

In some embodiments, the system 1400 includes intelligent learning processing 1430 that may implement processing similar as described regarding ILS 300 processing (FIG. 3), flow 400 processing (FIG. 4), flow 500 processing (FIG. 5), flow 600 processing (FIG. 6), flow 700 processing (FIG. 7), flow 800 processing (FIG. 8) and process 1300 (FIG. 13), as described above. In one embodiment, the intelligent learning processing 1430 along with an operating system (O/S) 1429 may be implemented as executable code residing in a memory of the system 1400. In another embodiment, the intelligent learning processing 1430 may be provided in hardware, firmware, etc.

In one embodiment, the main memory 1413, storage device 1414 and removable storage device 1415, each by themselves or in any combination, may store instructions for the embodiments described above that may be executed by the one or more processors 1411.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method for learning a task, comprising:
capturing first information associated with at least one application executed by an electronic device;
recording a sequence of user interface interactions for the at least one application;
extracting second information from the sequence of user interface interactions;
filtering event, action or a combination thereof from the second information using the first information;
performing recognition on each element from the first information to generate a semantic ontology; and
generating an executable sequential event task bytecode from each element of the semantic ontology and the filtered second information wherein the second information comprises at least one of system information or services information, the second information is processed to understand context and states, and the bytecode executable is based on a sequence of semantic events where each semantic event includes data providing a target user interface element, values of input, priority in event sequence and type of event.

2. The method of claim 1, wherein:
the first information comprises one or more of: a voice command utterance, information from a conversation or context information; and
the task bytecode is configured to execute on the at least one application for performing the task.

3. The method of claim 1, further comprising:
extracting metadata from the user interface interactions;
queuing the metadata and task information in a task event queue; and
filtering events, actions or a combination thereof from the second information further based on the task event queue.

4. The method of claim 3, further comprising:
adding additional voice or text data to each element of the sequence of user interface interactions to obtain additional metadata.

5. The method of claim 1, further comprising:
preprocessing the sequence of user interface interactions based on system, service and out of context data for the task by classifying text, image and user interface elements.

6. The method of claim 1, wherein the task bytecode is formulated to execute on the at least one application repeatedly based on user voice commands.

7. An electronic device comprising:
a memory storing instructions; and
at least one processor executing the instructions including a process configured to:
capture first information associated with at least one application that is executed by the electronic device;
record a sequence of user interface interactions for the at least one application;
extract second information from the sequence of user interface interactions;
filter event, action or a combination thereof from the second information using the first information;
perform recognition on each element from the first information to generate a semantic ontology; and
generate an executable sequential event task bytecode from each element of the semantic ontology and the filtered second information wherein the second information comprises at least one of system information or services information, the second information is processed to understand context and states, and the bytecode executable is based on a sequence of semantic events where each semantic event includes data providing a target user interface element, values of input, priority in event sequence and type of event.

8. The electronic device of claim 7, wherein:
the first information comprises one or more of a voice command utterance, information from a conversation or context information; and
the task bytecode is configured to execute on the at least one application for performing a task.

9. The electronic device of claim 7, wherein the process is further configured to:
extract metadata from the user interface interactions;
queue the metadata and task information in a task event queue; and
filtering events, actions or a combination thereof from the second information further based on the task event queue.

10. The electronic device of claim 9, wherein the process is further configured to:
add additional voice or text data to each element of the sequence of user interface interactions to obtain additional metadata.

11. The electronic device of claim 7, wherein the process is further configured to:
preprocess the sequence of user interface interactions based on system, service and out of context data for the task by classifying text, image and user interface elements.

12. The electronic device of claim 7, wherein the task bytecode is formulated to execute on the at least one application repeatedly based on user voice commands.

13. A non-transitory processor-readable medium that includes a program that when executed by a processor performing a method comprising:
capturing first information associated with at least one application executed by an electronic device;
recording a sequence of user interface interactions for the at least one application;
extracting second information from the sequence of user interface interactions;
filtering event, action or a combination thereof from the second information using the first information;
performing recognition on each element from the first information to generate a semantic ontology; and
generating an executable sequential event task bytecode from each element of the semantic ontology and the filtered second information wherein the second information comprises at least one of system information or services information, the second information is processed to understand context and states, and the bytecode executable is based on a sequence of semantic events where each semantic event includes data providing a target user interface element, values of input, priority in event sequence and type of event.

14. The non-transitory processor-readable medium of claim 13, wherein:
the first information comprises one or more of a voice command utterance, information from a conversation or from context; and
the task bytecode is configured to execute on the at least one application for performing the task.

15. The non-transitory processor-readable medium of claim 13, wherein the method further comprising:
extracting metadata from the user interface interactions;
queuing the metadata and task information in a task event queue; and
filtering events, actions or a combination thereof from the second information further based on the task event queue.

16. The non-transitory processor-readable medium of claim 15, wherein the method further comprising:
adding additional voice or text data to each element of the sequence of user interface interactions to obtain additional metadata; and
preprocessing the sequence of user interface interactions based on system, service and out of context data for the task by classifying text, image and user interface elements.

17. The non-transitory processor-readable medium of claim 13, wherein the task bytecode is formulated to execute on the at least one application repeatedly based on user voice commands.

* * * * *